Feb. 15, 1966 A. D. FALKOFF 3,235,845

ASSOCIATIVE MEMORY SYSTEM

Filed Dec. 28, 1960 10 Sheets-Sheet 1

INVENTOR
ADIN D. FALKOFF

BY Joe L. Koerber
ATTORNEY

ASSOCIATIVE MEMORY SYSTEM

Filed Dec. 28, 1960

10 Sheets-Sheet 2

Feb. 15, 1966 A. D. FALKOFF 3,235,845

ASSOCIATIVE MEMORY SYSTEM

Filed Dec. 28, 1960 10 Sheets-Sheet 3

ASSOCIATIVE MEMORY SYSTEM

Filed Dec. 28, 1960 10 Sheets-Sheet 4

| | | | BIT POSITIONS | | | | | | | | | GROUPS I | | | | | II | | III | IV | | | V | | VI | | | VII | | VIII | IX |
|---|---|---|---|---|---|---|---|---|---|---|---|---|---|---|---|---|---|---|---|---|---|---|---|---|---|---|---|---|---|---|---|
| WORD NO. | ORDINAL | WORD VALUE | 1 | 2 | 3 | 4 | 5 | 6 | 7 | 8 | WORD COUNT | INTERROGATION 1 | INT. 2 | INT. 3 | INT. 4 | INT. 5 | INT. 1 | INT. 2 | INT. 1 | INT. 1 | INT. 2 | INT. 3 | INT. 1 | INT. 2 | INT. 1 | INT. 2 | INT. 3 | INT. 1 | INT. 2 | INT. 1 | INT. 1 |
| 1 | 16 | 207 | 1 | 1 | 0 | 0 | 1 | 1 | 1 | 1 | 31-1 | 26-2 | 19-3 | 19-4 | 19-5 | 16-6 | | | | | | | | | | | | | | | |
| 2 | 17 | 199 | 1 | 1 | 0 | 0 | 0 | 1 | 1 | 1 | 31-1 | 26-2 | 19-3 | 19-4 | 19-5 | | 18-7 | 17-8 | | | | | | | | | | | | | |
| 3 | 18 | 197 | 1 | 1 | 0 | 0 | 0 | 1 | 0 | 1 | 31-1 | 26-2 | 19-3 | 19-4 | 19-5 | | 18-7 | | | | | | | | | | | | | | |
| 4 | 19 | 192 | 1 | 1 | 0 | 0 | 0 | 0 | 0 | 0 | 31-1 | 26-2 | 19-3 | 19-4 | 19-5 | | | | | | | | | | | | | | | | |
| 5 | 20 | 170 | 1 | 0 | 1 | 0 | 1 | 0 | 1 | 0 | 31-1 | 26-2 | | | | | | | 20-4 | | | | | | | | | | | | |
| 6 | 21 | 159 | 1 | 0 | 0 | 1 | 1 | 1 | 1 | 1 | 31-1 | 26-2 | | | | | | | | 22-5 | 22-6 | 21-7 | | | | | | | | | |
| 7 | 22 | 153 | 1 | 0 | 0 | 1 | 1 | 0 | 0 | 1 | 31-1 | 26-2 | | | | | | | | 22-5 | 22-6 | | | | | | | | | | |
| 8 | 23 | 142 | 1 | 0 | 0 | 0 | 1 | 1 | 1 | 0 | 31-1 | 26-2 | | | | | | | | | | | 24-6 | 23-7 | | | | | | | |
| 9 | 24 | 136 | 1 | 0 | 0 | 0 | 1 | 0 | 0 | 0 | 31-1 | 26-2 | | | | | | | | | | | 24-6 | | | | | | | | |
| 10 | 25 | 129 | 1 | 0 | 0 | 0 | 0 | 0 | 0 | 1 | 31-1 | 26-2 | | | | | | | | | | | | | 26-7 | 26-8 | 26-9 | | | | |
| 11 | 26 | 129 | 1 | 0 | 0 | 0 | 0 | 0 | 0 | 1 | 31-1 | 26-2 | | | | | | | | | | | | | 26-7 | 26-8 | 26-9 | | | | |
| 12 | 27 | 102 | 0 | 1 | 1 | 0 | 0 | 1 | 1 | 0 | 31-1 | | | | | | | | | | | | | | | | | 29-3 | 27-4 | | |
| 13 | 28 | 85 | 0 | 1 | 0 | 1 | 0 | 1 | 0 | 1 | 31-1 | | | | | | | | | | | | | | | | | 29-3 | | 28-5 | |
| 14 | 29 | 68 | 0 | 1 | 0 | 0 | 0 | 1 | 0 | 0 | 31-1 | | | | | | | | | | | | | | | | | 29-3 | | | |
| 15 | 30 | 58 | 0 | 0 | 1 | 1 | 1 | 0 | 1 | 0 | 31-1 | | | | | | | | | | | | | | | | | | | | 30-4 |
| 16 | 31 | 31 | 0 | 0 | 0 | 1 | 1 | 1 | 1 | 1 | 31-1 | | | | | | | | | | | | | | | | | | | | |

FIG. 6

United States Patent Office 3,235,845
Patented Feb. 15, 1966

3,235,845
ASSOCIATIVE MEMORY SYSTEM
Adin D. Falkoff, Croton-on-Hudson, N.Y., assignor to International Business Machines Corporation, New York, N.Y., a corporation of New York
Filed Dec. 28, 1960, Ser. No. 78,999
12 Claims. (Cl. 340—172.5)

Figure 1A:
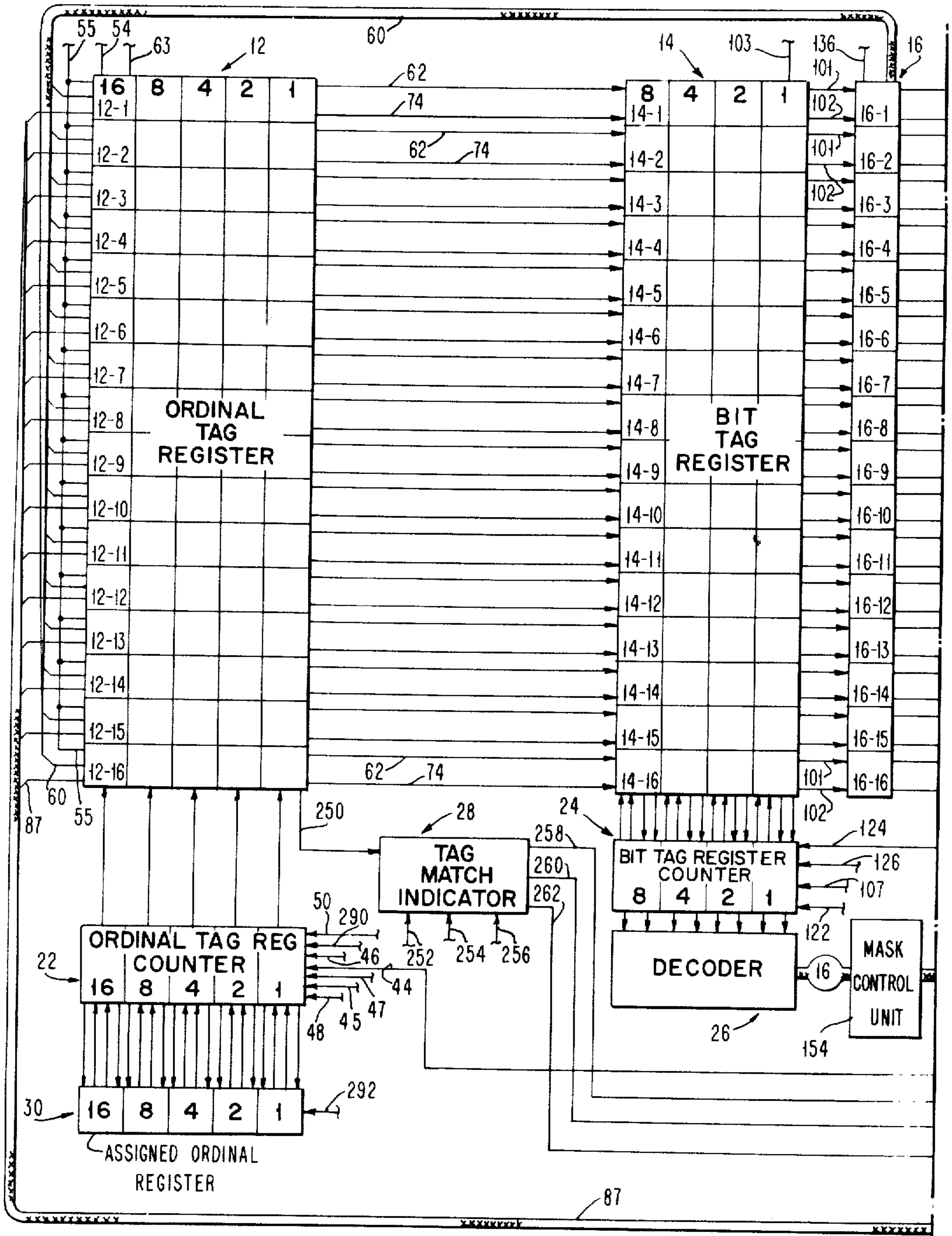

The present invention relates to a memory system and more particularly to a tag memory useable for assigning sequential tag numbers to words randomly arranged in a data memory in accordance with weighted criteria.

An associative memory system may be described generally as a system which includes a data or word memory in which information words are stored and a tag memory in which identifying tags for the information words are stored. It is sometimes desirable to store words randomly in a data memory and to thereafter assign tags to the words in accordance with weighted criteria such as numeric orders.

In accordance with the principles of the present invention there is provided a novel and improved memory system and more specifically a memory system in which words are randomly stored in a data memory with which there is associated a tag memory for recording tags indicative of some logical order of the randomly stored words. Also associated with the data memory is a bit tag register for keeping track of the bits of words that have been interrogated.

This invention is based upon a search procedure in which items to be sorted are first stored in a data memory, and are thereafter examined binary bit by binary bit in order to assign appropriate sequential tags. As successive binary bits of a group of binary words are examined, starting with the high order or most significant digit, the group of words containing significant digits in the successive orders becomes smaller until a single word is found containing a significant digit in a particular order. That single word will be the numerically largest word in the group.

Examination of each order generally will establish subgroups of words which will subsequently be examined in successively lower orders to establish the sequence of the words.

This invention includes a feed back feature whereby, each interrogation of a group of words defines the words which will be included in the group to be examined in the next lower order. Where a binary 1 is sought in the various orders, an output is derived only from those words in which the examined order contains a binary 1. These outputs define the words of the next group.

It is a primary object of this invention to provide a system for ordering stored data in accordance with weighted values assigned to stored data.

Another object of this invention is to provide a system for interrogating numerical words in the memory and assigning sequential tags to the words in accordance with their numerical values.

A further object of this invention is to interrogate data stored in a data memory in binary form and to assign ordinals to each data word in accordance with the sequential numerical value of the binary words in the data memory.

The foregoing and other objects, features and advantages of the invention will be apparent from the following more particular description of a preferred embodiment of the invention, as illustrated in the accompanying drawings.

Figure 1:
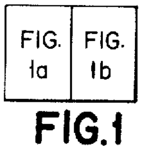
Figure 1B:
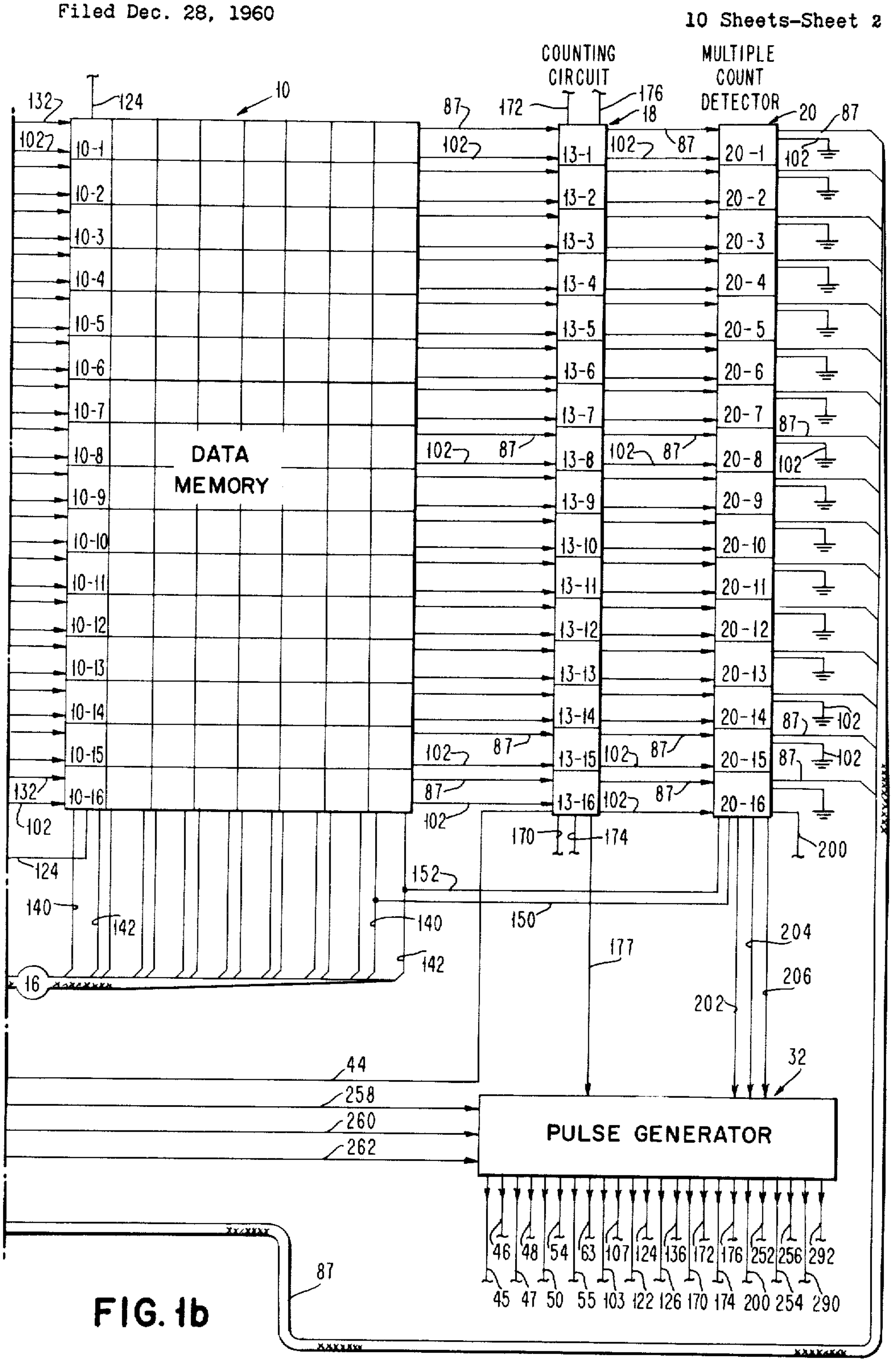

In the drawings:

FIG. 1 shows the arrangement of FIGS. 1*a* and 1*b*.

FIGS. 1*a* and 1*b* form a diagram of the system in block form.

Figures 2, 2A:
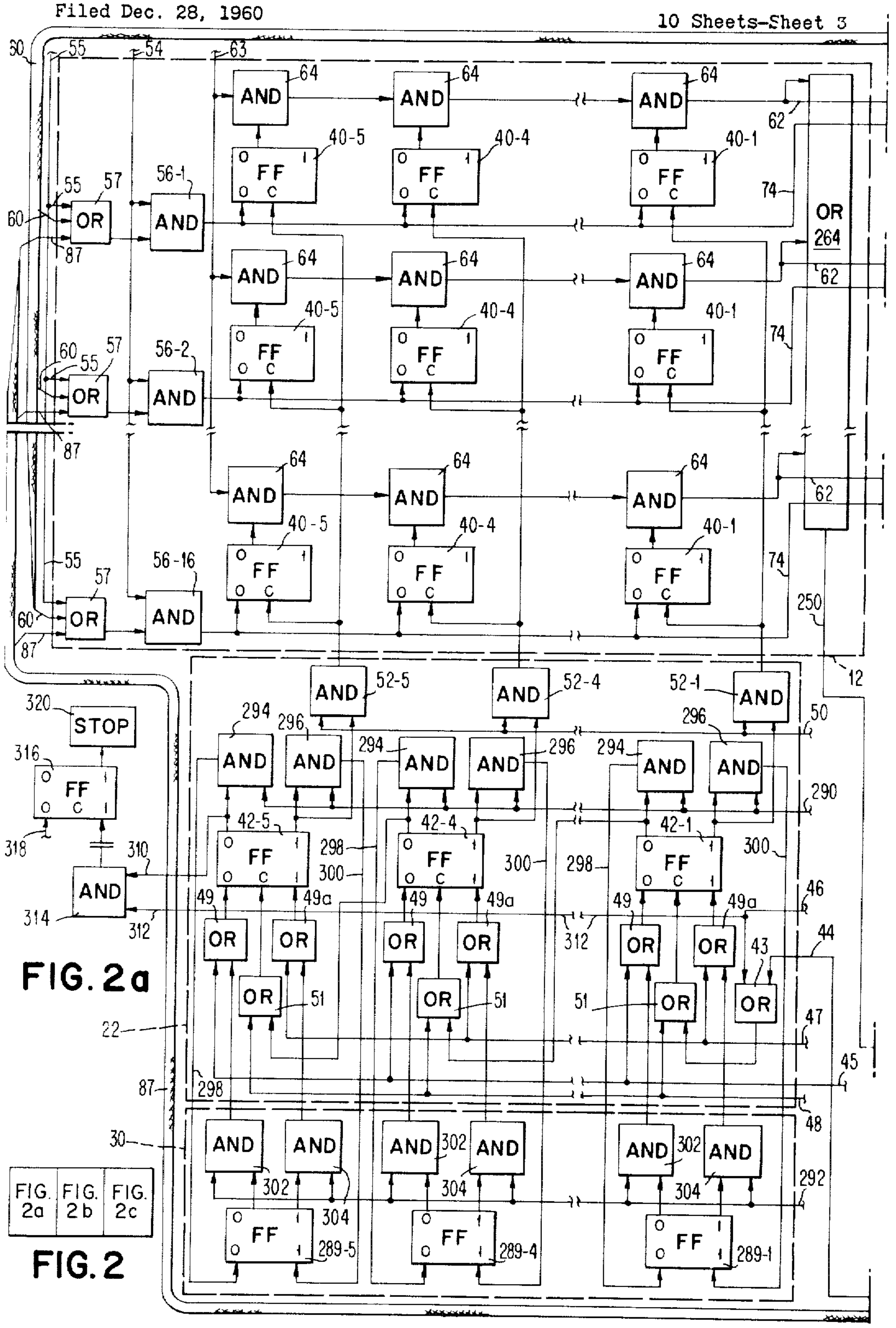
Figure 2B:
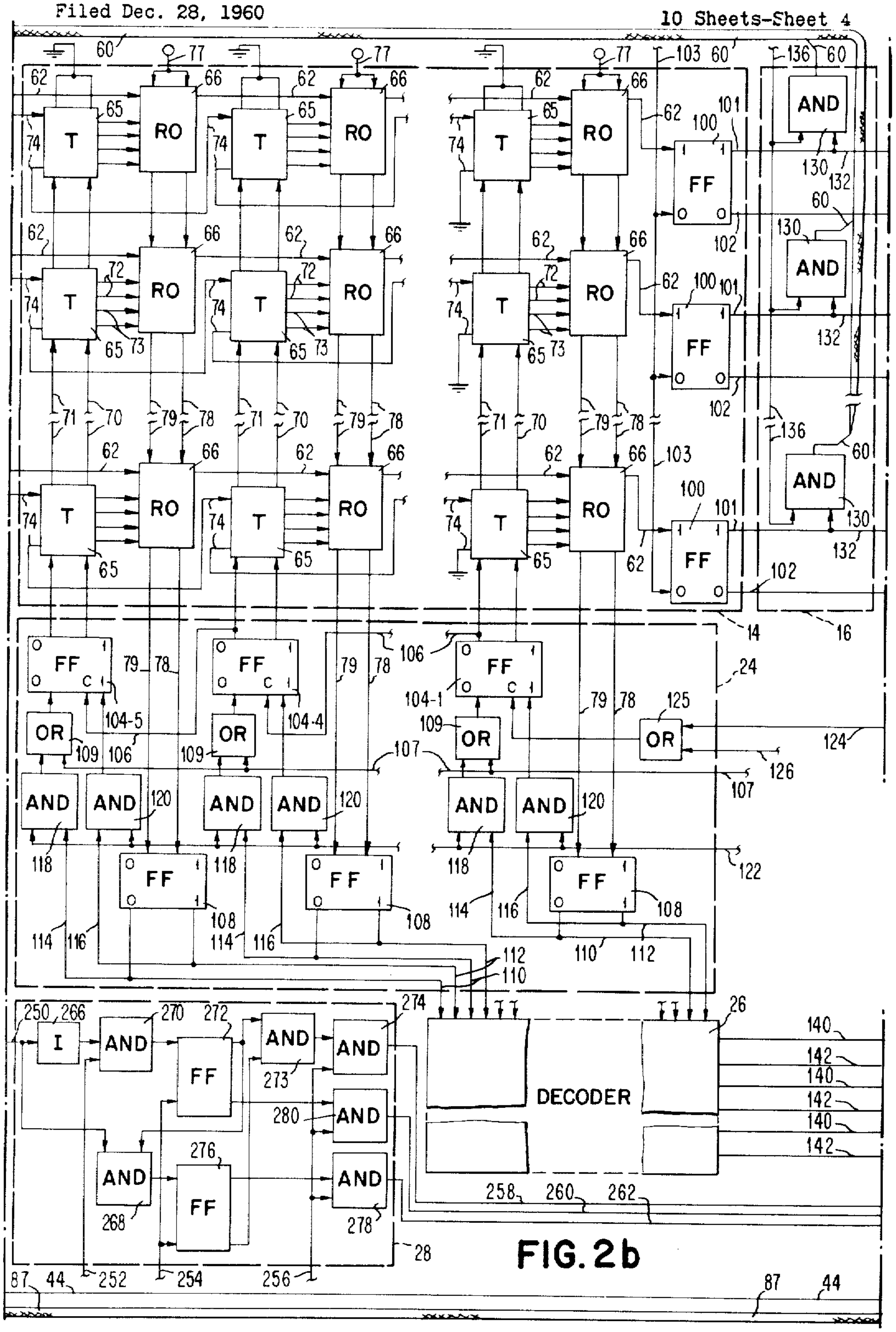
Figure 2C:
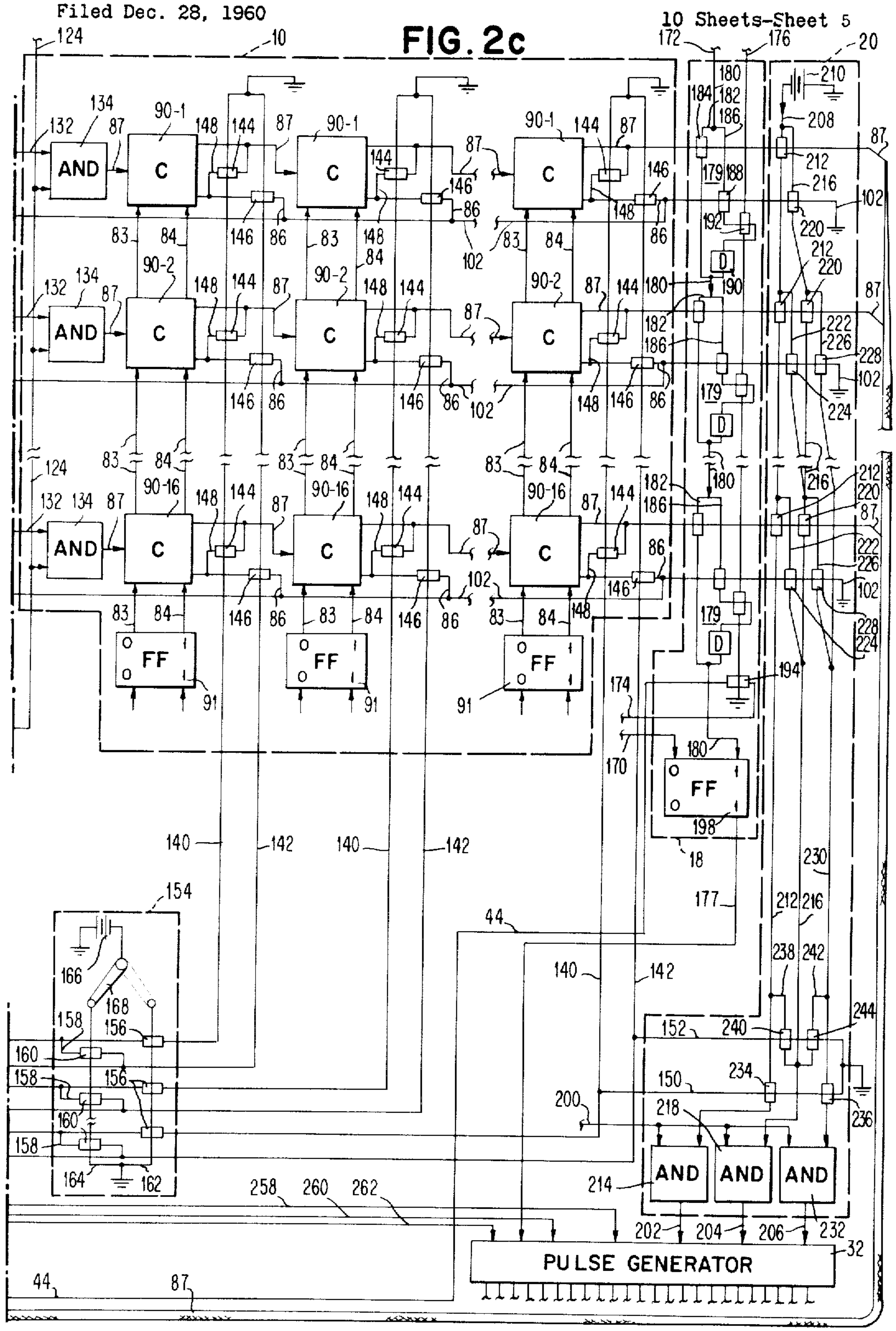

FIG. 2 shows the arrangement of FIGURES 2*a*, 2*b* and 2*c*.

FIGS. 2*a*, 2*b* and 2*c* are a circuit schematic of the system.

Figure 3:
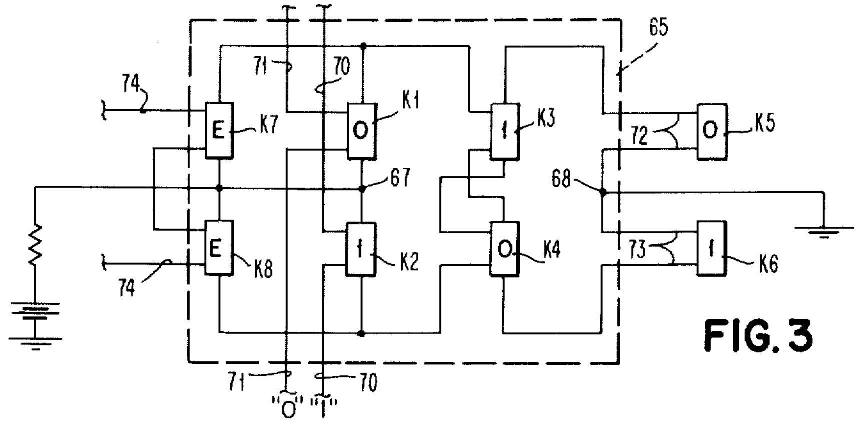

FIG. 3 is a bistable storage circuit.

Figure 4A:
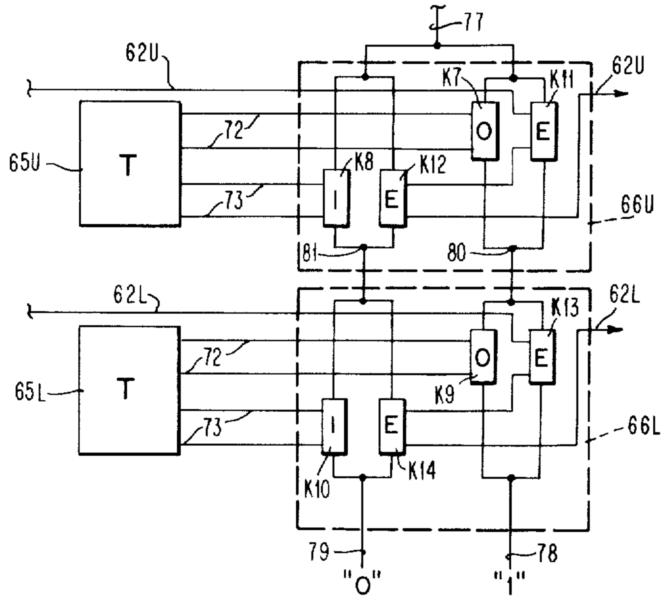

FIG. 4*a* is a read out circuit for a bistable storage circuit.

Figure 4B:
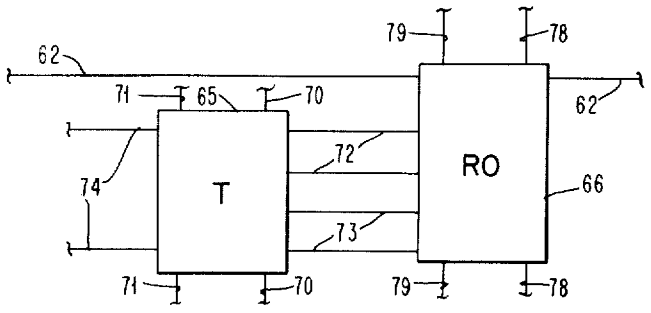

FIG. 4*b* is a diagrammatic illustration of the circuits shown in FIGS. 3 and 4*a*.

Figure 5A:
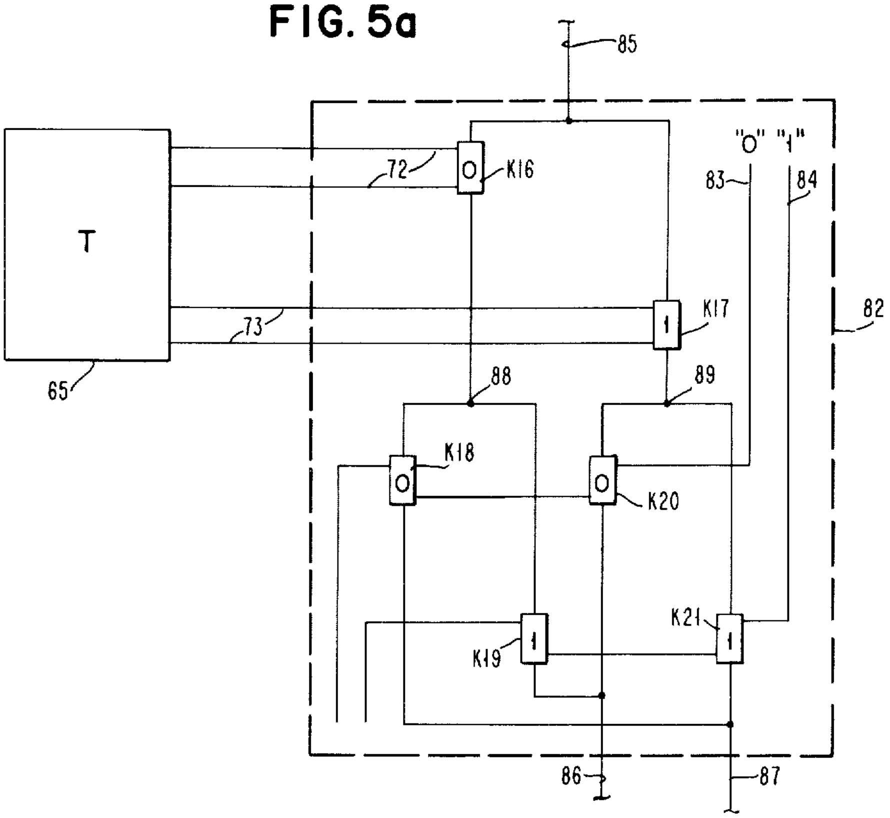

FIG. 5*a* is a compare circuit used with a bistable storage circuit.

Figure 5B:
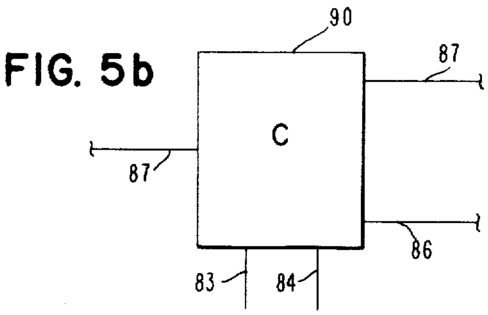

FIG. 5*b* is a diagrammatic illustration of the circuit shown in FIG. 5*a*.

FIG. 6 is a schematic representation of data stored in a data memory and the steps followed in assigning ordinals to the stored data.

Figure 7A:
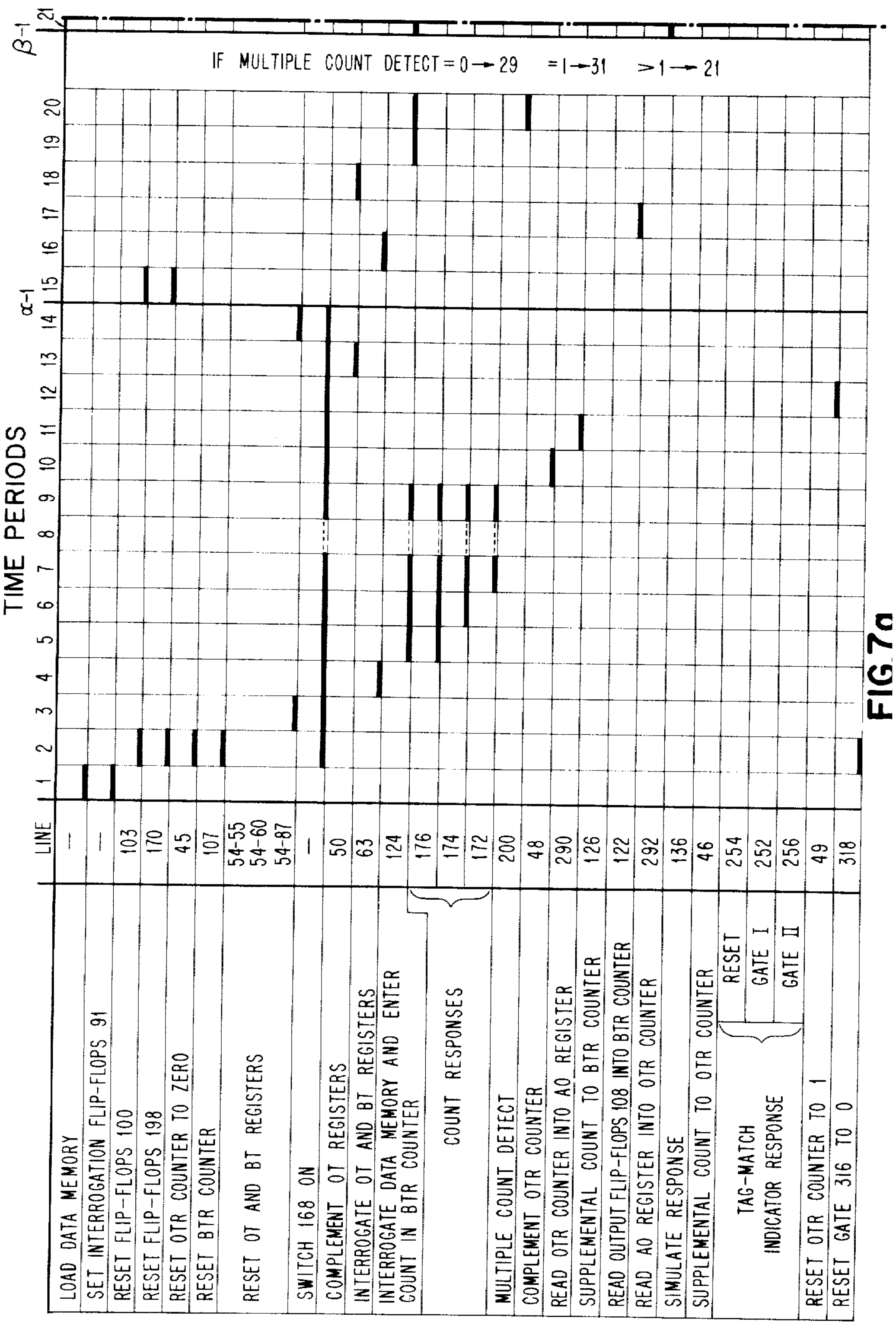
Figure 7B:
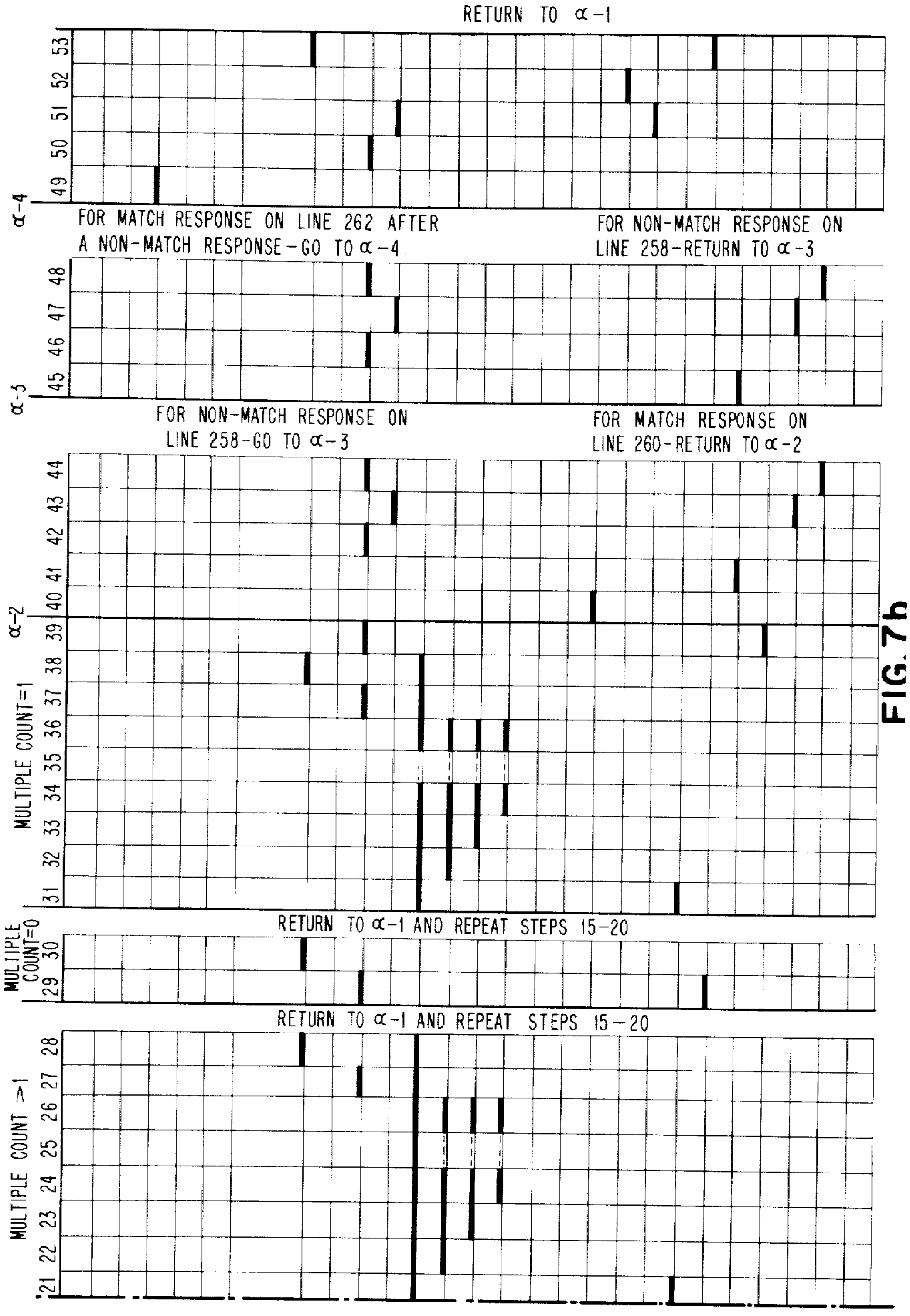

FIGS. 7*a* and 7*b* are timing charts.

*General description*

Referring to FIGS. 1*a* and 1*b*, a block diagram is shown of the overall system. The system as illustrated herein is based upon a data memory 10 consisting of 16 eight bit words. All other parameters of this system are designed to be compatible with this 16 word eight bit memory. However, it will be apparent that the data memory may be of any practical size both in words and in bits per word and that necessary changes will be made in other parts of the circuit in accordance with the size of the data memory.

An ordinal tag register unit 12, sometimes referred to as an OT register unit, is provided which has a capacity for storing a number equal to the total of words of the data memory unit 10. The ordinal tag register unit 12 consists of 16 five position binary registers, one associated with each word of the data memory. A bit tag register unit 14, sometimes referred to as a BT register unit, is provided which has a capacity for storing a number equal to the total of bits in the data memory words. The bit tag register unit 14 consists of 16 four position binary registers, one associated with each word of the data memory.

A gate unit 16 having 16 gates, one associated with each word of the data memory, is provided for simulating responses in instances to be described hereinafter. A counting circuit 18 is adapted to count the number of words of data memory which respond during each interrogation. A multiple-count detector 20 is associated with the counting circuit 18 to indicate one of three conditions as follows: (1) none of the words responded to an interrogation, (2) a single word responded, and (3) more than one word responded.

An ordinal tag register counter 22, sometimes referred to as an OTR counter, is associated with the ordinal tag registers and the counting circuit to count the number of words responding to each interrogation and to enter this count into OT registers corresponding to the responding words.

A bit tag register counter 24, sometimes referred to as a BTR counter, is associated with the bit tag register unit to keep track, for the various words of data memory, of the bit positions interrogated, and to enter this number into appropriate positions of the bit tag registers 14 as required. A decoder 26 is associated with the bit tag register counter 24 and the data memory 10 to condition appropriate bit positions of the data memory for interrogation. A tag match indicator 28 is associated with the ordinal tag register 12 to indicate one of three conditions during interrogation. The first condition indicates that none of the ordinal tag registers responded to an interrogation; the second condition indicates that at least one ordinal tag register responded to an interrogation, and the third condition indicates that, after having received a "no response" indication during one interrogation, a response was received on the next interrogation.

The various word positions and corresponding components are designated generally by a number, for example, 10, 12, 14, 16, 18 and 20. The words of data memory 10 are designated 10–1, 10–2, 10–3, etc. The bit positions are designated 1 through 8 in accordance with the order of interrogation, starting with the high order. Similarly the word and bit positions of registers 12 and 14; and units 16, 18 and 20 are designated by the general number designation and an appropriate suffix representative of the word number.

As assigned ordinal register 30 is associated with the ordinal tag register counter 22 and is used to store the highest finally assigned ordinal during a tagging operation.

A pulse generator 32 is provided to generate the various pulses and series of pulses required for the operation of the system.

In the operation of the illustrated system, words consisting of binary numbers up to eight binary bits are randomly stored in a data memory. The primary function of this system is to operate upon the binary numbers in such a manner as to assign ordinals to those numbers in accordance with their numerical values. It is possible to assign the lowest ordinal to either the highest number or to the lowest number and to assign the next lowest ordinal to the next number, etc. In the system described herein, the highest number is assigned the lowest ordinal. However, it will be understood that the lowest ordinal could be assigned to the lowest number.

The general operation of the system is as follows:

(1) Enter binary words randomly in the data memory.

(2) Count the number of words in the data memory and enter this tag number (ordinal) in the tag register associated with each word.

(3) Interrogate the high order position of all words in the data memory for the presence of a binary 1.

(4) Count the number of responses (1's) and enter this count in the tag registers for the word positions which respond, replacing the previously stored number (ordinal) in these registers, but leaving the former ordinal in those ordinal tag registers corresponding to words that did not respond in the last interrogation.

(5) Interrogate the second highest bit position of those words which last responded and count the number of responses (1's). Enter this count in the tag registers for the words now responding. This last number will again replace the number previously stored in the tag registers corresponding to the words that last responded.

(6) Repeat step 5 with successively lower bit positions until only a single response (1) is counted. Enter the ordinal 1 in the tag register corresponding to the word position which last responded, replacing the ordinal previously stored therein. The word having the ordinal 1 assigned thereto now corresponds to the largest number (word) in the data memory.

(7) Interrogate the tag registers for ordinals, 2, 3, 4, etc. in ascending order. At some point a hiatus will appear in this sequence, unless the sorting of all numbers is already completed. Enter the highest ordinal found in the sequence before the hiatus in an assigned ordinal register. This ordinal is designated P.

(8) Continue the interrogation for each higher ordinal until the first higher ordinal recorded in the tag register, after the hiatus, is found. This next higher ordinal is designated Q.

(9) Interrogate the appropriate bit positions of the items having the ordinal Q.

(10) Count the number of responses (1's), and add this count to the ordinal P in the assigned ordinal register. Enter this sum in the tag registers corresponding to the words which responded to this last interrogation.

(11) Repeat the interrogation on successively lower bit positions of this last group of words as in step 6, adding the value P from the assigned ordinal register to each count of responses, until a single response is received.

(12) Assign the ordinal $P+1$ to the single word which last responded.

(13) Repeat step 7 starting the interrogation with the value $P+2$ and enter the new value P′ in the assigned ordinal register.

(14) Repeat steps 8, 9, 10 and 11 until the sequence of steps results in a single response.

(15) Repeat steps 13 and 14 until no hiatus is found in the sequence of assigned ordinals. The sorting is then complete and each ordinal tag register contains an ordinal corresponding to the sequential position of the corresponding word in data memory.

In sorting the numbers from 0 to $N-1$, where $N=2^n$, the number of sequences ending in a single count will be $N/2$, and the average length of a sequence (number of bit interrogations) will be just two, if the first count of items is included as one interrogation. The total number of interrogations will thus be simply N. This follows in part from the fact that, with binary numbers, every odd number differs from the next lower even number only in the last bit position. Consequently, each time an odd number is identified, an even number is identified also. In such a set of numbers the number of ONE-bits will be $N \times n/2$, and each ONE-bit will be counted just once.

The time to sort this set of numbers can then be expressed as $$T=\frac{N}{2}(nt_c+2t_i+t_l)$$

where $t_c$ is the time for one count, $t_i$ is the time for a bit-position interrogation, and $t_l$ is the time for carrying out the logical operations at the end of a sequence. Using the values $t_c=t_i=1$ μsec., and $t_l=10$ μsec., which are not unreasonable with present technology, the time to sort $2^{12}$ items will be about 50 milliseconds. The time for $2^{14}$ items will be 213 milliseconds. It is noteworthy that the time to sort N items is very nearly linear with respect to N.

For any large set of densely packed numbers ($x$, $x+1$, $x+2$ . . . $x+N-1$) the formula holds approximately. The number of sequences remains $N/2$, the number of individual bit interrogations will be increased at most by the number of superfluous bits used in expressing a number of the set, and the number of extra counts will be no more than the total number of superfluous bits.

An upper bound for the more general case of $2^{n-1}<N<2^n$ items of bit-length $w$, where $w$ is greater than $n$, can be estimated as follows: Since each sequence identifies at least one number there will certainly be fewer than N sequences. Only one sequence will start with the first bit and one at most will start with the second bit. Two sequences may start with the third bit, four with the fourth, eight with the fifth, and so forth. Thus, the maximum possible length of a sequence decreases as the probability of its occurrence increases, and for large N the average length of a sequence will certainly be less than $w/2$. Thus, the number of interrogations will be less than $N \times w/2$. Again, the occurrence of ONES and ZEROS will be about equal, and the maximum number of counts will also be $N \times w/2$; although in general all the ONES may not be counted.

An estimate of the longest time to sort a set of items under these general conditions is then $$T=\frac{N}{2}(wt_c+wt_i+2t_l)$$

For 4000 items, 36 bits long, using the values for $t_c$, $t_i$, and $t_l$ above, the time will be 184 milliseconds.

Apart from the time estimates, this sorting method is inherently efficient. In contrast to procedures which match word against word and use the same information many times, this method uses each bit only once at most. On the average, the total number of interrogations required to sort N numbers is 1.5N.

If fields of greater length than the data memory word must be sorted, a partial sorting can be carried out on the first word-length and then continued on the balance of the record, either by holding the entire record in successive word positions or by emptying the data memory while holding the ordinals, and entering the balance of the record in corresponding memory positions. Similarly, if it is necessary to sort on only a portion of a record while related data is carried along as ballast, the original count of items can be entered only into the tag positions corresponding to the sorting fields.

The algorithm can be used directly for finding the "best match" to a given bit pattern. Instead of interrogating on ONES, any arbitrary bit pattern—in any order—could be used as an ordering criterion. A hierarchy of closeness-of-match will be established by the ordinals found by the algorithm. To do this it would only be necessary to hold the model bit pattern in the interrogation register and appropriately program the decoder associated with the bit tag register. This kind of use suggests itself very strongly for lexical applications.

*Ordinal tag register and ordinal tag register counter*

The basic circuit of the ordinal tag register 12 and the ordinal tag register counter 22 is shown and described in application Serial Number 809,808, filed April 29, 1959, now Pat. No. 3,093,814 on behalf of Eric G. Wagner and John McCarthy and assigned to the assignee of this invention.

A three digit, three register circuit is described in the above application, but it will be obvious that it can be expanded as desired, for example, to the five digit sixteen register circuit required for the ordinal tag register 16. Similarly, the illustrated three digit input register may be expanded to the five digit ordinal tag register counter 22.

Referring to FIGS. 1, 2*a*, 2*b* and 2*c*, since application Serial No. 809,808 shows a circuit which is the same as the ordinal tag register 12 and the ordinal tag register counter 22 taken together, the units 12 and 22 will be described and it will be understood that they function the same as the circuit in the above application except for certain added features which will be pointed out. The OTR counter 22 corresponds to the input register of the circuit in application Serial Number 809,808 and the OT registers 12–1 through 12–16 correspond to the registers A, B and C of the above application.

Each OT register 12–1 through 12–16 comprises five bistable storage devices 40 only the two left hand ones and the right hand one of rows 1, 2 and 16 being shown in FIG. 2*a*. The OTR counter 22 comprises five bistable storage devices 42, only the two left hand ones and the right hand one being shown. The binary 1 outputs from the devices 42 in the OTR counter are coupled through AND gates 52 to complement inputs C of associated devices 40 in the OT registers so that groups of these devices 40 can be complemented under control of the data stored in the OTR counter. With this arrangement, a tag which is entered in the OTR counter can be entered into any or all of the OT registers by first complementing each of the OT registers in accordance with the tag stored in the OTR counter, then resetting the devices 40 in the particular OT register or registers in which the tag is to be stored, and then again complementing all OT registers in accordance with the tag in the OTR counter, as described in the above application.

An operation similar to the operation of entering information into the OT registers may be employed to compare the tag in the OTR counter 22 simultaneously with the tags stored in all the OT registers. This comparison operation is similar to the above described reading operation in that the OT registers are complemented and later are recomplemented in accordance with the tags stored in the OTR counter. The simultaneous comparison is achieved by applying a read out signal to the output circuit for all OT registers after the first complement operation and prior to the second complement operation. An output is realized only from the particular ones of the OT registers which store the same tag as is stored in the OTR counter.

The OT register unit 12 includes 16 horizontal rows of five flip-flops 40, each row constituting an OT register. A row of five flip-flops 42 serves as the OTR counter. Each of the flip-flops 40 and 42 is bistable and, as is usual in binary systems, each flip-flop stores a binary 1 in one of these states and a binary 0 in the other of these states. Each of the flip-flops 40 and 42 is of the well-known type usually termed a complementary flip-flop. This means that the flip-flop may be complemented, that is, switched from the state it is in to its other stable state in response to an input applied at a complement input terminal. The complement input for each of these triggers is designated by the letter *c* and is located at the center of the lower portion of the block diagram for the flip-flop. The flip-flop may be set to its 0 and 1 states by inputs to the 0 and 1 input terminals respectively. The 0 and 1 inputs are located at the lower left and lower right corners respectively of the flip-flop block diagram.

The tag to be entered in the OT registers 12 is first placed in the OTR counter 22. Initially the OTR counter is set to 0 by a pulse on a line 45 and thereafter, successive count input pulses are fed to the complement terminals of the low order flip-flop 42–1. Alternate inputs to the low order flip-flop 42–1 generate carry pulses to the higher order flip-flops to register the correct count. The counting pulses may be derived from the counting circuit 18 or from the pulse generator 32 and enter the OTR counter via line 44 or 46 and an OR gate 43. A pulse on a line 48 complements all flip-flops 42. Lines 45 and 47 are connected through OR gates 49 and *49a* for setting flip-flops 42 to their binary zero and binary one states respectively.

To enter the count from the OTR counter into one or more OT registers 12, a complement pulse from the pulse generator 32 is applied to the OTR counter on a line 50. This pulse is directed as an input to AND gates 52–1 through 52–5, so that output pulses appear at the output terminals of all gates 52 which are connected to flip-flops 42 that are in their binary 1 states. Therefore, each flip-flop 40 which is connected to an AND gate 52 which in turn is connected to flip-flop 42 in its binary 1 state is complemented, that is, switched from the binary state that it is in to the opposite binary state. It is immaterial whether or not there is any information in an OT register when the read-in operation is initiated since the tag placed in the OTR counter may be selectively entered into any or all of the OT registers regardless of the original state of that register, without disturbing information stored in the other registers.

The second step in the read in operation is to reset to their binary 0 states, those OT registers in which it is desired to enter the count from the OTR counter. To reset an OT register, a reset pulse from the pulse generator 32 is applied to a line 54. In the above cited application this reset pulse is applied directly whereas, in the present invention, it is gated through AND gates 56 by pulses on lines 87 or 60 from a source described hereinafter. The signals on the lines 87, 60 or 54 are gated through OR gates 57. This reset pulse is applied to the 0 input of all flip-flops 40 in the register to be cleared so that each of these flip-flops is reset to its binary 0 state. All OT registers may be reset by coincident pulses on lines 54 and and 55.

The third step in the read-in operation is to apply another complement pulse to line 50. This complement pulse again causes all positions of OT registers 12 which are connected to flip-flops 42 in their binary 1 state to be complemented. Thus, flip-flops 40 which were not reset by the pulse on line 54 are returned to their original states and thus store the binary bits which they contained initially. OT registers 12 which were reset to their 0 state by the pulse applied on line 54 are complemented from the 0 state to the 1 state in accordance with the number in the OTR counter 22. Those flip-flops in the reset OT registers which were connected to the flip-flops 42 in their 0 state did not receive either the first or second complement pulses and therefore remain in the zero state in which they were placed by the reset pulse on line 54.

The OT registers 12 may be interrogated, i.e. searched for particular tags, by inserting the desired tag in the OTR counter 22. The first step in the interrogation operation is to enter the interrogation tag into the OTR counter. All of the OT registers may be simultaneously interrogated for this tag. First a complement pulse is applied to the line 50, as in the read-in operation. All flip-flops 40 in the OT registers which are connected to gates 52 which in turn are connected to flip-flops 42 that are in their binary 1 state will be complemented. Next, a read-out pulse generated in the pulse generator 32 is applied to an interrogation line 63. This read-out pulse passes through all gates 64 of the register or registers 12 containing the interrogated tag, since all these registers are then in the 0 state, some being in the 0 state because they originally stored a 0 and others being in a 0 state because they were complemented in response to the interrogation tag. The output lines 62 from the OT registers 12 serves as inputs to the corresponding bit tag registers 14. The final step in the interrogation operation is to again apply a complement pulse to the line 50 and thus to the inputs of the OT registers which were pulsed by the first complement signals. The flip-flops in the OT registers are again restored to their original states.

It should be apparent that it is only when the tag in a particular one of the OT registers compares exactly with the tag in the OTR counter that all of the flip-flops in that OT register will be in their binary 0 state after the first complement operation, to allow a read pulse on line 63 to reach the output line 62 associated with that OT register. In all other cases, all the binary bits of the tag stored in a particular OT register will not compare exactly with the corresponding binary bits of the interrogation tag in the OTR counter. Thus, one or more of the gates 64 associated with the flip-flops in that OT register will be closed when the read-out pulse is applied to line 63 and, therefore, the read out pulse will not reach the corresponding line 62.

Thus, it can be seen that the operation of reading into and interrogating the OT registers each includes 4 steps with the first, second and fourth steps in each operation being the same. First, the tag which is to be either entered into the OT register or used as an interrogation tag is entered into the OTR counter. Second, a complement pulse is applied to the line 50 to complement the flip-flops in each vertical column of the OT register unit 12 for which the binary value in the corresponding of flip-flop 42 in the OTR counter is one. Third, an interrogation pulse is applied to line 63 to effect a comparison of the tag in the OTR counter simultaneously with the tags in all the OT registers; or a reset pulse is applied to the line 54 to reset to 0 all of the flip-flops in the particular OT register or registers into which the tag stored in the OTR counter is to be entered. Fourth and finally, in the case of an interrogation operation, a complement pulse is applied to line 50 to reset previously complemented flip-flops to their original state and, in the case of the read-in operation, to enter the tag stored in the OTR counter into the OT registers which were cleared during the third step.

*Bit tag register and data memory components*

The basic circuit for the bit tag register 14 and the data memory 10 are shown and described in application Serial Number 744,157, filed June 24, 1958, now Pat. No. 3,134,095, on behalf of Harold F. Heath, Jr., and assigned to the assignee of this invention.

Referring first to the bit tag register 14 in FIG. 2, the blocks 65 and 66 shown therein and also labelled T and RO respectively, correspond to the circuit shown in FIGS. 2 and 9 of the last cited application. The same circuits are illustrated herein in FIGS. 3, 4*a* and 4*b*.

*Binary trigger circuit*

Referring to FIG. 3, the cryotron trigger circuit shown therein includes 6 cryotrons K1 through K6 which are connected in two parallel current paths between a pair of terminals 67 and 68, the former terminal being connected to a current source 69 and the latter either directly to ground as shown, or through further superconductive circuits to a common or ground terminal. One of the parallel paths includes the gates of cryotrons K1 and K4 and the control coils of cryotrons K3 and K6, and the other path includes the gates of cryotrons K2 and K3 and the control coils of cryotrons K4 and K5. Binary 0 inputs for the circuit are applied through a line 71 to the control coils of cryotron K1. Binary 1 inputs are applied through a line 70 to the control coil of the cryotron K2. When the circuit is in the binary 1 state, the cryotrons K2, K3 and K6 are resistive and, when in the binary 0 state, the other three cryotrons are resistive, as is indicated by the "1" and "0" designations in the blocks representing the gates of these cryotrons. When in either of these states, the current from the source 69 is entirely in the path including the superconductive cryotron gates. Cryotrons K3 and K4 may be termed cross-coupled cryotrons since their coils and gates are connected in different paths so that they are effective to maintain the circuit stably in the binary 0 and binary 1 states, respectively. The state of the circuit is manifested by the condition of the gates of cryotrons K5 and K6, the former being resistive and the latter superconductive when the circuit is in the binary 0 state and the condition of each being reversed when the circuit is in the binary 1 state. Lines 72 and 73 represent the control windings of output cryotrons K5 and K6 respectively. The cryotrons K7 and K8 are termed enable cryotrons and have their gates connected across the gates of input cryotrons K1 and K2, respectively. These cryotrons must be driven resistive before inputs applied to the 0 and 1 input lines 70 and 71, which are connected to the coils of cryotrons K1 and K2, respectively, are effective to change the stable state of the circuit. The enable inputs are applied to a line 74 which is connected to the control coils for cryotrons K7 and K8 and it is only when a signal is applied to this line that the state of the trigger may be altered by applying an input signal to one or the other of the lines 70 and 71.

*Read out circuit*

FIG. 4*a* shows two positions of a register wherein binary information is stored in two addressable triggers such as trigger 65. These two positions are connected in one column of an array of columns and rows of memory positions. The circuitry 66 shown associated with these triggers is also designated RO for "read out" and is employed to selectively read out the information stored in the triggers 65U (for 65 upper) or 65L (for 65 lower). The read out circuit RO which is associated with the trigger 65U includes a pair of cryotrons K7 and K8, the states of which are controlled in accordance with the value stored in the associated trigger. Similarly, the read out circuit associated with the trigger 65L includes a pair of cryotrons K9 and K10, the states of which are controlled in accordance with the valves stored in the associated trigger 65L. Each of these read out circuits is also provided with a pair of enable cryotrons which, in the read out circuit associated with trigger 65U, are designated K11 and K12, and, in the read out circuit associated with the trigger, 65L, are designated K13 and K14. The state of the cryotrons of K11 and K12 is controlled by enable signals which are applied to an enable line 62U and, similarly, the state of cryotrons K13 and K14 is controlled by enable signals applied to an enable input designated 62L. The output leads for these enable lines are also designated 62U and 62L and each of these leads may be connected to further read out circuits which are to be enabled in response to signals applied to input leads 62U and 62L. The read out current for the circuit is applied at a lead 77 which is steered to one or the other of two output leads 78 and 79 for the particular column in which the triggers 65U and 65L are connected. When the current on lead 77 is steered to terminal 78, it indicates that the particular one of the triggers in that column then being interrogated is in the binary one state, and when current is steered to lead 79, it indicates that the trigger being interrogated is in the binary zero state.

The particular one of the triggers which is interrogated when a read out pulse is applied to lead 77 is controlled by the application of an enable signal to a selected one of the enable lines 62U and 62L. For example, consider the case where trigger 65U is in the binary zero state and it is desired to interrogate the state of this trigger. In this case, cryotron K7 is resistive and cryotron K8 is superconductive. In order to interrogate this trigger, it is necessary to apply an enable pulse to lead 62U and thereby drive enable cryotrons K11 and K12 resistive. No signal is applied to enable lead 62L so enable cryotrons K13 and K14 remain in a superconductive state. When, with the cryotrons in this condition, a read out pulse is applied to lead 77, since cryotrons K7, K11 and K12 are resistive, the current is directed through the then superconductive cryotron K8 to a terminal 80. In the present invention current is constantly applied to the line 77 and the read out is controlled by the enable pulses on line 62. In this mode of operation, the current output will be maintained between enable pulses on either line 78 or 79, persisting in that parallel branch in which it was forced when the previous enable pulse was applied. The current then passes through the enable cryotron K14, which is then in a superconductive state, to output lead 79 to indicate the binary zero condition of trigger 65U. Similarly, when the trigger 65U is in the binary one condition, the current from line 77 is directed through the then superconductive cryotron gate K7 to a terminal 81 and thence through enable cryotron K13 to terminal line 78, thus indicating the binary one stored in trigger 65U. The operation is similar when it is desired to interrogate trigger 65L with the exception that, in this case, an enable pulse is applied to lead 62L to drive enable cryotrons K13 and K14 resistive, and no pulse is applied to enable lead 62U so cryotrons K11 and K12 remain in a superconductive state.

Since, as in the above described interrogation, the enable cryotrons K11 and K12 provide a superconductive shunt for cryotrons K7 and K8, the current from line 77 is steered to lead 78 and 79 in accordance with the state of cryotrons K9 and K10 which are controlled in accordance with the value then stored in trigger 65L. It can be seen that any number of read out circuits for triggers such as 65U and 65L may be connected in this manner with all of the zero representing cryotrons in one parallel circuit extending from line 77 to the binary one output lead 78, and all of the one representing cryotrons connected in another parallel path from line 77 to the binary zero output lead 79 for the column.

Each of the binary one and zero representing cryotrons are provided with shunting enable cryotrons such as are shown in FIG. 4*a* so that any particular one of the triggers in the column may be interrogated by energizing the particular enable lead for the read out circuit associated with that trigger.

In the circuits of FIGS. 2*a*, 2*b* and 2*c* the circuits 65 and 66 are represented by the block diagram shown in FIG. 4*b*.

*Compare circuit*

Referring to FIG. 5*a*, there is shown a compare circuit 82 which is utilized during interrogation of the state of a trigger such as the trigger 65 described hereinbefore with reference to FIG. 3. In FIG. 5*a*, only the output coil leads 72 and 73 from the trigger 65, represented in block form, are illustrated. The coils connected to these leads control the state of cryotrons K16 and K17 respectively, which correspond to the output cryotrons K5 and K6 shown in FIG. 3. This compare circuit is operable to steer a supply current to one or the other of two output terminals or leads in accordance with whether the interrogation input compares or does not compare with the value stored in an associated trigger 65. This circuit includes the gates of six cryotrons K16–K21. One or the other of the cryotrons K16 and K17 is resistive in accordance with the value stored in the trigger 65. Cryotrons K18 and K20 are driven resistive when a signal is applied to a lead 83, indicative of an interrogate input representative of binary zero, and cryotrons K19 and K21 are driven resistive when a signal is applied to lead 84, indicative of an interrogate input representative of binary one. Supply current for the circuit is applied to a lead 85. The output for the circuit is realized at one or the other of two output leads designated 86 and 87. When, upon interrogation, the interrogate input on line 83 or 84 compares with the value stored in the trigger 65, the current is steered from line 85 to line 87; and, when the interrogate input does not compare, the current is steered from line 85 to line 86. In all cases, there is at least one completely superconductive path from the line 85 to either one or the other, but not both, of the lines 86 and 87. For example, when the trigger 65 is in the 1 condition and, therefore, cryotron K17 is resistive and K16 superconductive, the current flows from line 85 through cryotron K16 to a terminal 88. From this terminal, the current will be directed through cryotron K18 to output line 87 when the interrogate input is representative of a binary one and, therefore, a comparison is indicated, and through the cryotron K19 to line 86 when the interrogate input is a binary zero and, therefore, does not compare with the value stored in the trigger. Similarly, when the trigger 65 is storing a binary zero, the current from line 85 is directed to a terminal 89 and thence through either cryotron K20 or K21 to line 86 or 87 in accordance with whether the interrogate input is a binary one or a binary zero.

During interrogation of a bit position of the data memory 10, the only thing of interest is whether a binary one bit is stored in the associated trigger 65. Therefore, in the block representation shown in FIG. 5*b*, and designated 90 which represents the trigger-compare circuit combination shown in FIG. 5*a*, only the lines 83, 84, 86 and 87 are shown. Since the output line of one compare circuit 90, in FIG. 2*c* is the input line 85 of the succeeding compare circuit, only the designation 87 is used in **FIGS. 2*c*** and 5*b* for all input and output lines including those for the high order bit positions of the data memory.

For the purpose of illustrating a mode of operation of this invention in which only binary 1's are sought, it is assumed that a constant current is maintained on interrogate input lines 84 of all comparison circuits 90 shown in FIG. 2*c*. This may be done by setting a group of flip-flops 91 comprising an interrogation register to the binary 1 state. Hence when a binary one is stored in the associated trigger 65 and a pulse is applied to input line 85, a pulse will emerge on line 87. If a binary zero is stored, the pulse will emerge on line 86. It is to be understood, however, that this implies no loss of generality in the applications and uses of this invention since it is within the scope of application Serial Number 744,157, already referred to, to apply currents to either of the lines 83 or 84 of circuits 90, which currents are indicative of an arbitrary pattern of zeros and ones with respect to which the memory may be interrogated. Thus, in the particular operation to be described, the assumption of a constant current on lines 84 of circuits 90 is equivalent to an interrogation pattern consisting of ones in all column positions.

*Bit tag register*

Referring to FIG. 2*b* the bit tag register unit 14 consists of 16 horizontal rows, each row consisting of four of the basic components, only the two left hand ones and the right hand one of rows 1, 2 and 16 being shown. The basic component is the combination of an addressable trigger 65 associated with a read out unit 66, as illustrated in FIG. 4*b*.

An enable line 74 threads each row of triggers 65 whereby 0 and 1 binary bits may be stored therein by pulsing the binary 0 lines 71 or the binary 1 lines 70. It will thus be seen that a binary 0 or a binary 1 may be inserted selectively in corresponding bit positions of an individual bit tag register 14 by pulsing respectively the 0 line 71 or the 1 line 70 while at the same time pulsing the enable line 74 for those BT registers 14 in which it is desired to record the binary bit. It will be noted that pulses on these enable lines 74 are derived from pulses on lines 87 or 60 which are gated through AND gates 56 in the OT register unit 12 by reset-write pulses on line 54.

It has been described hereinbefore how a signal is derived on a particular line 62 when the interrogation of the corresponding OT register 12 shows a comparison with the tag in the OTR counter 22. This signal on the line 62 is effective to read out the binary bits of information in the corresponding BT register 14 and, after having passed through all read out units 66 of that particular BT register, to turn on a corresponding flip-flop 100 which indicates that the corresponding OT register 12 has just responded positively to an interrogation. A response is indicated by a signal on a binary one line 101 whereas a lack of response is indicated by a signal on a binary zero line 102.

A reset line 103 is common connected to the binary 0 terminals of the flip-flops 100 to reset them to 0 for purposes described hereinafter.

*Bit tag register counter*

In accordance with the mode of operation of this invention, the BT registers 14 which are interrogated at any one time will all contain the same bit position number. The value read out of each bit position of the BT register will be manifested by signals on binary 0 lines 79 or binary 1 lines 78 as described hereinbefore. These signals are fed to the BTR counter 24, FIG. 2*b*. Inputs to the BT registers 14 are received from the BTR counter on the binary zero and binary 1 lines 71 and 70 respectively, as described hereinbefore.

The BTR counter 24 is similar to the OTR counter 22 and consists of four flip-flops 104 connected in series by lines 106 whereby successive input pulses to the complement terminal of the low order flip-flop 104, through appropriate carries, enters a count of the input pulses into the BTR counter. Only the two left hand flip-flops 104 and the right hand one are shown in FIG. 2*b*. The binary value in the BTR counter 24 is transferred into BT registers 14 when enable signals are received on the lines 74, as described hereinbefore. The output lines 79 and 78 from the BT registers 14 are fed to the 0 and 1 input terminals respectively of output flip-flops 108. These input terminals are located at the upper sides of the diagrammatic illustrations in FIG. 2*b*. The output flip-flops 108 are shown as are included in the BTR counter 24. A line 107 is connected through individual OR gates 109 to the binary zero inputs of the flip-flops 104 for resetting them to zero.

The binary values entered in the flip-flops 108 are fed through lines 110 and 112 to the decoder unit 26. The binary states of the flip-flops 108 are also fed through lines 114 and 116 and AND gates 118 and 120 to the corresponding flip-flops 104 which constitute the BTR counter. The binary values in the flip-flops 108 are gated into the flip-flops 104 by a gating signal on a line 122. Counting pulses for advancing the BTR counter 24 are generated in the pulse generator 32 and are fed to the BTR counter through line 124 or line 126.

*Data memory*

The data memory 10 consists of 16 registers each capable of storing a word consisting of eight binary bits. Each bit of this word is stored in an addressable trigger of the type described with reference to FIG. 3. Each addressable trigger 65 has associated therewith a compare unit 82 which is illustrated in FIGURE 5*a*. Since the manner of entering and storing a word in memory is not a part of the present invention, the storage unit per se, that is, the addressable trigger 65, is not shown but rather the diagrammatic representation of the trigger-compare unit 90, shown in FIG. 5*b*, is shown in FIG. 2*c* as representing each bit position in data memory. Only the two left hand columns and the right hand column of units 90 are shown for words 1, 2 and 16. As previously described with reference to FIG. 5*b*, an input to the compare unit 90 will emerge on line 87 if the associated bit position stores a binary digit which matches the interrogation pattern set up in the associated flip-flop 91, and will emerge on the line 86 if the corresponding bit position does not store a matching digit.

The output of each of the BT registers 14 consists of lines 101 and 102, a signal on the line 101 indicating that the corresponding OT register has responded positively to an interrogation and a signal on the line 102 indicating that the corresponding OT register did not respond positively. The signal on the line 102 flows directly through the AND gate unit 16, through the data memory 10, through the counting circuit 18, and through the multiple count detector 20 to ground. Within the gate unit 16 each line 101 feeds to one terminal of an AND gate 130 and also continues on a line 132 to an AND gate 134 associated with a corresponding word in data memory 10. An input line 136 to the gate unit 16 is commonly connected as the second input to all AND gates 130. The outputs of the AND gates 130 are the lines 60 which are the alternate gating inputs to the AND circuits 56 in the OT registers 12.

The previously described line 124 which is connected as an input to the BTR counter 24 also serves as an input line to the data memory 10 and is commonly connected as the gating input to all AND gates 134. A pair of lines 140 and 142 is associated with each column of binary bit registers in the data memory 10, for use in conjunction with the decoder 26 for interrogating one binary bit position of data memory at a time. Each line 140 forms the control winding for a cryotron gate 144 associated with the match output line 87 of each compare unit 90 whereas each line 142 forms the control winding for a cryotron gate 146 associated with the no-match output line 86 of each compare unit 90 in the associated column. The no-match output line 86 extends through the gate 146 to the line 102. The no-match line branches through a line 148 and the gate element 144 to the binary 1 line 87. With a current applied to the line 140, the cryotron gates 144 are rendered resistive and current on a no-match line 86 flows to the line 102 and then to ground. When current is applied to the line 142, current flows through the control winding of cryotron gates 146, rendering the gates 146 resistive and diverting current from a no-match line 86 to the match line 87, thus making a mismatch appear to the next lower binary bit register 90 as a match rather than as a mismatch. The purpose of this circuit is described hereinafter. The pair of lines 140 and 142 associated with the low order bit position registers 90 branch through lines 150 and 152 to the multiple count detector circuit 20 for a purpose described hereinafter.

Referring to FIG. 1, the lines 140 and 142, shown in cable form, pass through a cryotron unit 154. Referring to FIG. 2*c*, each line 140 includes a cryotron gate element 156. Each pair of lines 140 and 142 is connected by a line 158 which includes a cryotron gate element 160. A line 162 forms the control winding for all cryotron gate elements 156 whereas a line 164 forms the control winding for all cryotron gate elements 160. The lines 162 and 164 are common connected to ground at one end and are selectively connectable to a power source 166 by a switch 168. In the OFF position, the switch 168 is connected to the line 164 whereas, in the ON position the switch is connected to the line 162. When the switch 168 is in the ON position all outputs from the decoder 26 are on lines 142, since cryotron gates 156 in all lines 140 are then resistive and all cryotron gates 160 are superconductive. Thus, all cryotron gates 146 in the data memory are made resistive and all outputs from compare circuits 90 appears as match outputs regardless of the actual binary state of the corresponding storage trigger. This circuit is necessary to obtain the initial count of the number of words in the data memory 10 to be sorted or ordered. When the switch 168 is in the OFF position, the cryotrons 160 are resistive and outputs from the decoder 26 follow their normal paths in lines 140 and 142. Since the BTR counter has a capacity larger than required to count the binary bits of a data word, a particular count could be used to apply current to all lines 142 and thus eliminate the need for the mask control unit 154.

*Decoder*

The decoder unit 26 may be any conventional type decoder, for example, a relay type the only requirement being that it be capable of energizing particular combinations of lines in accordance with various inputs. In the particular embodiment described in detail herein, the decoder energizes lines 140 and 142 in eight combinations in accordance with the setting of the BTR registers which store the bit position numbers of words in data memory. Eight-bit words are used and the BTR counter is shown as a four position binary counter. The inputs to this BTR counter are the values between 1 and 8 in binary form. In response to each of these eight possible inputs, the decoder must energize the line 140 of one pair of lines 140–142 and must energize the line 142 in all other pairs. In counting the bit positions, the number 1 is assigned to the high order bit position of a word of data memory to signify that this is the first bit position interrogated. The next lower order is given the value 2 and so on. The following chart indicates which of the lines 140 and 142 carry current for the eight possible inputs which are represented in binary form.

| INPUT | | | | OUTPUT | | | | | | | |
|---|---|---|---|---|---|---|---|---|---|---|---|
| | | | | Bit Position | | | | | | | |
| Lines 140 and 142 | | | | 1 | 2 | 3 | 4 | 5 | 6 | 7 | 8 |
| 0 | 0 | 0 | 1 | *140* | 142 | 142 | 142 | 142 | 142 | 142 | 142 |
| 0 | 0 | 1 | 0 | 142 | *140* | 142 | 142 | 142 | 142 | 142 | 142 |
| 0 | 0 | 1 | 1 | 142 | 142 | *140* | 142 | 142 | 142 | 142 | 142 |
| 0 | 1 | 0 | 0 | 142 | 142 | 142 | *140* | 142 | 142 | 142 | 142 |
| 0 | 1 | 0 | 1 | 142 | 142 | 142 | 142 | *140* | 142 | 142 | 142 |
| 0 | 1 | 1 | 0 | 142 | 142 | 142 | 142 | 142 | *140* | 142 | 142 |
| 0 | 1 | 1 | 1 | 142 | 142 | 142 | 142 | 142 | 142 | *140* | 142 |
| 1 | 0 | 0 | 0 | 142 | 142 | 142 | 142 | 142 | 142 | 142 | *140* |

While a particular operation has been described, it will be apparent that a programable decoder could be used to select various fields of a data word for interrogation or to select bit positions for interrogation in sequences other than highest to lowest or lowest to highest. The most significant bit should be interrogated first but, since weights other than numeric may be applied to various bits, the most significant bit need not be the highest order bit.

*Counting circuit*

Referring to FIG. 1, the counting circuit 18 consists of 16 counting units, each unit corresponding to a word in the data memory 10. The common inputs to the counting circuit 18 consist of 4 lines 170, 172, 174 and 176. These lines receive signals from the pulse generator 32. Individual inputs to the 16 units of the counting circuit consist of the lines 87 and 102 from the corresponding words in the data memory 10. The output from the counting circuit 18 is the line 44 referred to in the description of the OTR counter 22.

Referring to FIG. 2*c* only the upper two units corresponding to words 1 and 2 and the lower unit corresponding to word 16 are shown. It is seen that each unit of the counting circuit 18 includes a closed loop 179, having an input line 180. It will be noted that the input line 180 of each loop after the first is also the output line of the preceding loop. The left side of the loop consists of a line 182 and a cryotron gate element 184, whereas the right side of the loop consists of a line 186, a cryotron gate element 188 and a delay device 190. The delay device may be a length of transmission line, for example. The line 186 also forms the control winding for a cryotron gate element 192 which is in the line 176. The cryotron gate elements 192, one for each of the 16 counting units of the counting circuit 18 are connected in series. The line 176 also forms the control winding for a cryotron gate element 194 and then continues to ground. The input line 174 includes the cryotron gate element 194 and thereafter emerges from the counting circuit 18 as the line 44 which is the input to the OTR counter 22.

The output line 180 of the lower loop 179 is connected to the binary 1 input of a flip-flop 198. The input line 170 is connected to the binary 0 input of the flip-flop 198. The binary 1 output of the flip-flop 198 is connected to the output line 177 which in turn is connected to the pulse generator 32.

To illustrate operation of the counting circuit 18, assume, for a particular bit position of the data memory being interrogated, that the odd numbered word positions store a binary 1 and even numbered word positions store a binary 0. Currents generated in the pulse generator 32 are applied to the lines 170, 176, 174 and 172 in that order.

First, current is applied to the line 170 to reset the flip-flop 198 to its binary 0 state. Next, current is applied to line 176 and flows through cryotron gate elements 192 and the control winding of cryotron gate element 194 to ground, rendering the gate 194 resistive. Current is next applied to the line 174 but is blocked by the resistive state of the cryotron gate element 194.

Since the odd numbered word positions of the data memory store binary 1's, the corresponding gate elements 184 will be resistive and current will flow in the right hand lines 186 of the odd numbered loops 179. The gate elements 188 of the even numbered counter units are resistive and current will flow in the left hand lines 182 of the even numbered loops. It will be apparent that the currents flowing in the left hand lines 182 merely flow ineffectively to the next loop 179 where they may be effective to count a binary 1. With the flip-flop 198 reset to 0 and currents applied to lines 176 and 174, current is then applied to the line 172 and, in the first word position, flows through the line 186, through the superconducting cryotron gate element 188 and through the control winding of the cryotron gate element 192 thus rendering gate element 192 resistive and blocking the flow of current in the line 176. Blocking the flow of current in the line 176 permits the cryotron gate element 194 to return to its superconductive state and permits current to flow from the line 174 through the gate element 194. The output on the line 44 is fed to the OTR counter 22 where a count is entered into the counter for each current pulse passed by the gate 194. The pulse applied to the line 172 is delayed in the delay unit 190 and, after this delay, is fed into the next loop 179. In the recited example, the cryotron gate element 188 of this second loop 179 is resistive and the gate element 184 is superconductive, whereby the current flows through the left hand line 182 to the third loop 179 without delay. This third loop has been defined as having the gate element 184 resistive and the gate element 188 superconductive whereby the current flows again in the right hand line 186 and renders the corresponding gate element 192 resistive, again blocking the current on the line 176 and permitting current to flow in the line 174 to again enter a counting pulse into the line 44. The current on the line 172 flows through the remaining loops 179, being delayed by a delay unit 190 each time a pulse is counted and then proceeding on until it reaches the binary 1 input of the flip-flop 198. When the pulse reaches the flip-flop 198 and switches it to its binary 1 state, the output on the line 177 feeds into the pulse generator 32 and shuts off the pulses to the lines 172, 174 and 176 in that order.

*Multiple count detector*

The function of the multiple count detector 20 is to indicate the number of interrogated word bit positions which responded to an interrogation of a particular binary bit position of data memory for the presence of matches. The multiple count detector consists of sixteen individual units, each corresponding to a word in data memory. The inputs to the individual units are the lines 87 and 102. Two inputs to the multiple count detector 20 are the previously referred to lines 150 and 152 connected to the lines 140 and 142 respectively and leading to the low order bit positions of the data memory words. Another input is a line 200 which receives input signals from the pulse generator 32. The outputs from the multiple count detector are three lines 202, 204 and 206. Current on the line 202 indicates that none of the interrogated word positions responded to an interrogation for a matching bit; current on the line 204 indicates that a single word position responded; and a signal on the lines 206 indicates that more than one word position responded.

The multiple count detector is essentially a cryogenic tree network consisting of 16 units, one corresponding to each word of data memory. A first line 208 is connected to a power source 210 and in series through sixteen cryogenic gate elements 212, one associated with each word of data memory, to an AND gate 214. Only the upper two units corresponding to words 1 and 2 and the lower unit corresponding to word 16 are shown in FIG. 2*c*. The output line 87 of each word of data memory forms the control winding for the associated gate element 212. Between the source of supply 210 and the first gate element 212, the line 208 branches into a line 216 which extends through all sixteen units of the multiple count detector to a second AND gate 218. This line 216 includes 16 cryogenic gate elements 220, one being paired with each gate element 212. The gate element 220 associated with the first word of data memory is linked by the corresponding data memory output line 102 as a control winding. The remaining fifteen gates 220 are linked by the lines 87 from the corresponding words of data memory.

In each of the multiple count detector units, after the one corresponding to word 1 of data memory, the line 208 branches into lines 222. Each line 222 is connected to the line 208 ahead of the corresponding gate element 212 and, after passing through a cryogenic gate element 224, is connected into the line 216. In each of the multiple count detector units, after the one corresponding to word 1 of data memory, the line 216 branches into a line 226. Each line 226 is connected to the line 216 ahead of the corresponding cryogenic gate element 220 and, after passing through a cryogenic gate element 228, is connected to aline 230 which extends through all units of the multiple count detector, except those corresponding to words 1 and 2 of data memory, and is connected to an AND gate 232.

The input line 200 is common connected as the gating input for the AND gates 214, 218 and 232. If, during an interrogation for binary 1's, none of the word positions of data memory respond, current from the source 210 flows through the line 208 to the AND gate 214. Thereafter a signal applied to the line 200 gates the signal into the pulse generator 32 via the line 202 where it is effective to initiate a particular sequence of pulses as described hereinafter .

If the line 87 corresponding to any word of memory carries a current indicating the presence of a binary 1 bit, the corresponding cryotron gate element 212 is rendered resistive and current on the line 208 is diverted to the line 216 to the AND gate 218 where it is gated by a pulse on the line 200 into the pulse generator 32, via the line 204. Current on the line 216 indicates that a single word of data memory responded with a binary 1 indication and a particular sequence of pulses is initiated as described hereinafter.

After a binary 1 response from any word position, a subsequent binary 1 response from any other word position diverts the current from the line 216 to the line 230 whereby the AND gate 232 is conditioned and a pulse will be fed via the line 206 into the pulse generator where it is effective to initiate a particular sequence of pulses as described hereinafter.

Since two or more identical words may be stored in the data memory and since the only way a particular interrogation sequence may be terminated is to obtain a count of "only one" from the multiple count detector 20, circuitry is provided to give an "only one" response whenever low order bit positions of a particular group of data memory words are interrogated. This is in no way prejudice to the results since, if more than one word responds to this interrogation they are identical words.

Lines 208 and 230 include cryotron gate elements 234 and 236 respectively. A line 238 connecting lines 208 and 216 includes a cryotron gate element 240. A line 242 connecting lines 216 and 230 includes a cryotron gate element 244. The input line 150 forms a control winding for gate elements 234 and 236 and is connected to ground. The line 152 forms a control winding for gate elements 240 and 244 and is connected to ground. When the low order bit position of data memory is interrogated, current appears on the corresponding line 140 and thus on the line 150, whereby gate elements 234 and 236 are rendered resistive. At this time, there is no current on the line 152 and the gate elements 240 and 244 are superconductive. Therefore, current appearing on either line 208 or 230 is diverted to the line 216, thus simulating an "only one" response. During interrogation of all bit positions of data memory other than the low order bit position, current appears on the line 152 and thus inhibits the connecting lines 238 and 242.

*Tag match indicator*

The tag match indicator 28, FIG. 2*b*, is associated with the OT registers 12 to indicate one of the three conditions during a particular interrogation sequence. The first condition indicates that none of the OT registers responded positively to interrogation for a matching tag; the second condition indicates that at least one OT register responded; and the third condition indicates that, after having received a non-response indication during one interrogation, a response was received on the next interrogation.

Referring to FIGS. 1 and 2*b*, the tag match indicator has four inputs 250, 252, 254 and 256. The input 250 is from the OT register unit 12, whereas the inputs 252, 254 and 256 are connected to the pulse generator 32 and received pulses therefrom. The tag match indicator has three output lines 258, 260 and 262 which feed into the pulse generator 32 to initiate particular sequences of pulses.

Referring to FIG. 2*a*, an OR gate 264 in the OT register unit 12 receives the output of each OT register which responds to an interrogation showing that the responding register contains the same tag as that stored in the OTR counter 22. The output of OR gate 264 is fed through the line 250 to the tag match indicator 28 where it is fed in parallel to an inverter 266 and an AND gate 268. The output of the inverter 266 is fed to an AND gate 270. The second input of the AND gate 270 is the input line 252. The output of AND gate 270 is connected to the binary 1 input of a flip-flop 272 and the binary 1 output of the flip-flop 272 is fed in parallel to AND gates 268 and 273. The output of AND gate 268 is connected to the binary 1 input of a flip-flop 276 and the binary 1 output of the flip-flop 276 is fed to an AND gate 278. The binary 0 output of the flip-flop 276 is fed to the AND gate 273. The output of AND gate 273 is fed to an AND gate 274. The input 254 is connected in parallel to the binary 0 inputs of the flip-flops 272 and 276. The binary 0 output of the flip-flop 272 is connected to an AND gate 280. The input 256 is commonly connected to the AND gates 274, 278 and 280. The output of AND gate 274 is the output line 258; the output of AND gate 280 is the output line 260; and the output of AND gate 278 is the output line 262.

The tag match indicator is first reset by pulsing line 254. This resets flip-flops 272 and 276 to their binary zero states. The binary 0 output of the flip-flop 272 is gated by a signal on line 256 through the AND gate 280 to the line 260. This is the equivalent of a positive response to the interrogation for an OT register tag matching the OTR counter tag and initiates a particular sequence of pulses in the pulse generator 32.

If the interrogated tag is not present in any of the OT registers there is no output from the OR gate 264 to the line 250. This negative response, when inverted by the inverter 266, appears to the AND gate 270 as a positive response and is gated through by a signal on the line 252 to switch the flip-flop 272 to its binary 1 state. The binary 1 output is fed to the AND gate 273 where it is gated to the AND gate 274 by the binary 0 output of flip-flop 276. The input to AND gate 274 is gated to the line 258 by a gating pulse on the line 256 whereby a particular sequence of pulses is initiated in the pulse generator 32. The binary 1 output of the flip-flop 272 is also fed to the AND gate 268 to condition it for a subsequent positive response on the line 250. When a subsequent interrogation does produce a positive response on the line 250, it is gated through the AND gate 268 to switch the flip-flop 276 to its binary 1 state, closing gate 273. The binary 1 output of the flip-flop 276 is gated through the AND gate 278 by a pulse on the line 256. The signal on the line 262 is fed to the pulse generator 32 where it initiates a particular sequence of pulses.

*Assigned ordinal tag register*

The assigned ordinal register (AO register) 30 is a series of binary flip-flops 289, one corresponding to each bit position of the OTR counter 22. In accordance with the FIG. 2*a* illustration of the OTR counter 22, only the two left hand flip-flops 289 and the right hand one are shown. The AO register 30 is adapted to receive the contents of the OTR counter in response to a gating signal on a line 290. The AO register also is adapted to enter the contents of the AO register into the OTR counter in response to a signal on a line 292.

AND gates 294 are connected to the binary 0 output of each flip-flop 42 in the OTR counter. AND gates 296 are connected to the binary 1 output of each of the flip-flops 42. The line 290 is connected in parallel to all AND gates 294 and 296 to gate the contents of the OTR counter to the AO register 30 through binary 0 lines 298 and binary 1 lines 300.

AND gates 302 and 304 are connected to the binary 0 and binary 1 outputs respectively of the flip-flops 289. The line 292 is commonly connected to the AND gates 302 and 304 to gate the contents of flip-flops 289 into the flip-flops 42 of the OTR counter through the OR gates 49 and 49*a*.

*Pulse generator*

The pulse generator 32 may be any suitable generator capable of generating the desired pulses in the desired order. Since the design of a pulse generator is not a part of the present invention and the construction of a suitable one is within the scope of those skilled in the art, the details of a pulse generator are not shown. Instead, a timing chart, FIG. 7, indicates the sequence of the various pulses which are required.

*Circuit operation*

Having described the individual components of the system and the manner in which each functions individually, the system operation and the cooperation of these components in the system will be described. As previously indicated, the function of this system is to operate upon data stored in the data memory 10 in such a manner as to enter numerical tags or ordinals in the OT registers corresponding to the words in data memory in accordance with the weighted values of information bits comprising the words. The specific operation described is the ordering of binary numbers in accordance with their relative values. It is possible to assign these tags whereby the lowest numbered tag corresponds to either the lowest valued number in data memory or to the highest valued number. In the example described hereinafter, the lowest numbered tag is assigned to the highest valued word in data memory.

FIG. 7 is a timing chart which is referred to in the description of the system and indicates the sequence of the various signals within the system. Along the top edge of the timing chart are 53 numbered columns which correspond to 53 time periods during operation of the system. Some of the steps which are shown as starting or occurring sequentially, could start or occur coincidentally, but, for simplicity of illustration, are shown as starting or occurring sequentially. Arranged along the left edge of the timing chart are a number of titles which refer to the particular operation which is performed. In an adjacent column numbers are shown which indicate the lines upon which the various signals appear to perform the particular operation.

Also noted at the top of the timing chart are a number of designations alpha 1, alpha 2, alpha 3, alpha 4 and beta 1. These designations and the corresponding vertical lines separate the timing chart into groups of steps, some of which may be repeated during the operation of the system, depending upon the particular responses detected at various times.

Referring to FIG. 6, a schematic representation of the data memory 10 shows 16 words arranged in horizontal rows as in the circuit schematic. The columns numbered 1–8 correspond respectively to the eight bit positions, with the high order bit position being numbered 1, since it is the first bit position interrogated. On the left side of the figure, the words are numbered 1–16 and, as illustrated here are arranged sequentially in accordance with their values 207, 199, 197, 192, 170, 159, 153, 142, 136, 129, 129, 102, 85, 68, 58 and 31 which are indicated in the word value column. However, it will be apparent from the following description that the words may be stored in random order and will be correctly operated upon irrespective of the random arrangement. However, the illustrated sequential arrangement is convenient for purposes of explanation.

In the first column on the left, the ordinals 1 through 16 are shown. However, it is noted that the 16 words will be numbered 16 through 31, as illustrated in the second column from the left, rather than 1 through 16. The purpose of this is to illustrate a versatile feature of the machine in which the capacity of the OTR counter 22 need not be the same as the capacity of data memory or the same as the number of words to be sequentially ordered. It will be apparent from the description that it would be even simpler to arrange a system where the capacity of the OTR counter corresponded exactly with the number of words to be ordered in which case the ordinal 1 could be assigned to the largest word and 16 to the smallest word. While the actual word count in the example is 16, the capacity of the OTR counter is 31 and therefore the difference between the number of words and the full capacity of the counter is added in each case to form the assigned ordinal.

Referring to FIG. 6, the initial word count, supplemented by the difference in the counter capacity is initially stored in each of the OT registers 12 and, as indicated by the fact that the number following the ordinal 31 in the word count column is a 1, this was done on the 0 bit cycle. In other words, it was not done during the interrogation of any one of the eight bit positions. During interrogation of the first bit of all sixteen words, as indicated by the number 1 in the Group I, Interrogation 1 column of FIG. 6, eleven words responded to the interrogation for a binary 1 in this bit position. The bit number 2 is stored in the sixteen corresponding BT register 14, this being the appropriate bit number for the next interrogation of this group of words. The difference in the number of words and the capacity of the counter is 15 and therefore the number 15 is added to the number of responding words, eleven, and the sum 26 is stored in the OT registers 12 corresponding to the eleven responding words.

During interrogation of the second bit positions of this group of eleven words which are designated Group I, only four words responded and therefore the ordinal 19 (15+4) is stored in the OT registers corresponding to these four words, replacing the ordinal 26. The next bit position number 3 is stored in the corresponding BT registers, replacing the number 2. The third bit positions of these last responding four words are interrogated and since all four contain binary 0's in the third bit positions, they do not respond, but a response is simulated, whereby the ordinal 19 is restored again in the corresponding OT registers and the new bit position number 4 is stored in the corresponding BT registers. The fourth bit positions of these four words are interrogated and since all four bit positions contain binary 0's, a response again is simulated and the ordinal 19 is again restored in the corresponding OT registers. The corresponding BT registers are advanced to store the digit 5 representing the next bit to be interrogated. During the fifth interrogation cycle, the fifth bit positions of these four words are examined and only one response is obtained. The OT registers corresponding to the three non-responding words remain set at 19. However, the ordinal 16 (15+1) is entered in the OT register corresponding to the responding word and the number 6 is stored in the corresponding BT register.

At this time the first ordinal 16 has been permanently assigned. Also at this time the ordinal 19 is correctly assigned to one of the three numbers in whose OT register it is stored. Similarly the number 26 is correctely assigned to one of the seven words in the corresponding OT registers of which the ordinal is stored, and the ordinal 31 is correctly assigned to one of the 5 words in the corresponding OT registers of which the ordinal 31 is now stored. The processing of a group is completed each time an ordinal is assigned to a single word. Thus, the first group interrogation is ended and the second group interrogation may be started.

Group II includes the remaining three words of the group of words which were initially assigned the ordinal 19. The fifth bit position of the remaining three words having the ordinal 19 need not be interrogated because their failure to respond indicated that their fifth bit positions contained binary 0's and their bit count was advanced to 6 when they were identified by their ordinal 19. Therefore the sixth bit positions are interrogated and only two words respond as having binary 1's. The ordinal 18 (16+2) is stored in the two corresponding OT registers and the ordinal 19 remains in the OT register corresponding to the third word. During the interrogation of the seventh bits of these two words, a single word responds and therefore this word is assigned the next ordinal after the highest permanently assigned ordinal, in this case, the ordinal 17. Since only two words had been assigned the ordinal 18 and one of these ordinals has been changed to 17, the ordinal 18 was properly assigned to the other word. Similarly, since the two of the three words which were assigned the ordinal 19 have been assigned the ordinals 17 and 18, the third word is properly assigned the ordinal 19. This is the end of the second group interrogation.

Group III consists of the remaining seven words which have been assigned the ordinal 26. The second bit positions of these seven words are not to be examined, since it is known by their elimination on the second step of the Group I interrogation that all contain binary 0 in this bit position, and the bit count is advanced to 3. The third bit positions of these seven words are examined and a single word responds. Therefore, the next higher ordinal 20 is assigned to this word and is stored in the OT register corresponding thereto. The number 4 is stored in the corresponding BT register. This is the end of the Group III interrogation which consisted of only one interrogation.

Group IV interrogation is made on the remaining six words which have the ordinal 26. The fourth bit positions of these six words are interrogated and only two words respond. Therefore, these two words are assigned the ordinal 22 (20+2) in the corresponding OT registers and the bit position number 5 is stored in the corresponding BT registers. Interrogation of the fifth bit positions of these two words shows that both contain binary 0's and therefore binary 1 responses are simulated to restore the ordinal 22 in the corresponding OT registers. The bit number 6 is stored in the corresponding BT registers. Interrogation of the sixth bit position of these two words results in a response from only one of the two words. This word is assigned the next higher ordinal 21 and, since only two words have been assigned the ordinal 22, the second word has properly been designated 22.

The Group V interrogation is performed upon the remaining 4 words which were assigned the ordinal 26. The interrogation starts in the fifth bit position and results in a response from only two words which are assigned the ordinal 24 (22+2). Interrogation of the sixth bit position of these two words results in a single response and the ordinal 23 is assigned to the responding word. The ordinal 24 remains assigned to the other word.

The Group VI interrogation is performed upon the remaining two words which have the ordinal 26. The interrogation of the fifth and sixth bit positions shows binary 0's in both words. Interrogation of the seventh last bit positions again results in two responses. The ordinal 26 remains assigned to both words. Ordinal 25 will be skipped.

The remaining five words which were assigned the ordinal 31 form Group VII and are interrogated in the second bit positions. Only three words respond. Therefore, these three words are assigned the ordinal 29 (26+3) and the bit number 3 is stored in a corresponding BT register. Interrogation of the third bit positions of the three words results in a single response and the ordinal 27 is assigned to the responding word.

In the Group VIII interrogation, the two remaining words having the ordinal 29 are interrogated in the fourth bit positions. A single response is received whereby the ordinal 28 is assigned to the responding word and the ordinal 29 remains assigned to the other word.

In the Group IX interrogation, the remaining two words having the ordinal 31 are interrogated in the third bit positions and the ordinal 30 is assigned to the word which responds to an interrogation for binary 1's. The ordinal 31 remains assigned to the last word.

It is thus seen that, at the time an ordinal is first assigned to a group of words, that ordinal is properly assigned to one word of the group and the ordinals assigned to all other words in that group will subsequently be changed where there is more than one word in the group.

In the embodiment shown herein, identical ordinals are assigned to identical words as was done in the case of words ten and eleven. The assigned ordinal is that which would have been assigned to the lowest valued word of the group if all words had all been different.

It will now be described in detail how the assignment of ordinals is accomplished.

*Initial cycle*

Before starting the operation of assigning ordinals to the numbers in data memory, the system must be placed in starting condition. First, as indicated in time period 1 of FIG. 7, words are loaded into the data memory 10 and interrogation flip-flops 91 are set. In the given example, all flip-flops 91 are set to binary 1. It was pointed out previously that the circuitry for storing binary bits in data memory is not a part of this invention and is shown in another application. Therefore the actual storage circuitry is not shown, although it is schematically represented by the block 90 shown in FIG. 5*b*.

It is assumed that the data memory is completely loaded with sixteen words which may vary in length from one to eight binary bits. The system would function with the data memory being less than completely filled, however, for this example, the data memory is assumed to be completely filled. The operation with a lesser number of words will be obvious.

During time period 2, the flip-flops 100 in the BT register unit 14 are reset by applying a signal from the pulse generator 32 to the line 103. The count control flip-flop 198 in the counting circuit 18 is reset by the application of a pulse to the line 170. The OTR counter 22 is reset to zero by the application of a pulse to the line 45. The BTR counter 24 is reset to zero by the application of a pulse to the line 107. The switch 168 in the mask control unit 154 is set to the ON position.

During time period 3, all OT registers 12 and BT registers 14 are reset by coincident signals on lines 54 and 55.

During time period 4 the OT registers 12 and BT registers 14 are interrogated by the application of a tag interrogation signal to the line 63. Since the AND gates 64 in the OT registers are connected to the binary 0 outputs of the flip-flops 40, and since all flip-flops 40 are in their binary 0 state, the signal on line 63 passes through all AND gates 64 of all OT registers 12 to the OR gate 264. The output of the OR gate 264 on line 250 is ignored at this time. However, the signals also by-pass the OR gate 264 on lines 62 and pass in series through the read out units 66 of the BT registers, causing the contents of the BT registers to be read out to the output flip-flops 108. At this time the value read out is zero. The output of flip-flops 108 is fed to the decoder unit 26. The signals on all sixteen of the lines 62 after passing through the read out units 66 switch the associated flip-flops 100 to their binary 1 states.

During time period 5, a data memory interrogation signal is applied to the line 124. This interrogation signal passes through OR gate 125 and enters a count of 1 in the BTR counter 24. The interrogation signal on the line 124 also is gated through all sixteen AND gates 134 by the binary 1 states of the flip-flops 100.

Since the switch 168 is in the ON position, all of the lines 140 are inhibited. Thus, with the lines 140 inhibited, all currents whether they were initially destined for lines 140 or 142 appear on lines 142 due to the shunt lines 158 which run from the lines 140 to the lines 142. With all cryotron gates 146 rendered resistive, all currents coming from compare units 90, whether they are on a line 87 indicative of the storage of binary 1's or on lines 86 indicative of the storage of binary 0's, appear on the input lines 87 to the next succeeding compare units 90.

Since all flip-flops 100 are in their binary 1 state, the application of the interrogation signal to line 124 causes signals to emerge from the data memory 10 on all sixteen lines 87. The currents on the lines 87 pass through the counting circuits 18, the multiple count detect circuit 20 and through the cabled lines 87, feeding back into all sixteen OT registers 12. Referring to the timing chart, FIG. 7, the interrogation and counting take place during time periods 5 through 9. At time period 5, coincident with the application of the interrogation signal to line 124, a counting signal is applied to line 176 of the counting circuit 18; at time period 6 a signal is applied to line 174; and at time period 7 a signal is applied to line 172. During time period 7 these latter three signals are coincident and effect counting in the manner described hereinbefore with reference to the counting circuit. It is noted that all signals which are indicated as being ON during time period 8 are represented by broken lines. The reason for the broken line representation is that the counting period is of a variable length due to the delay units 190 inserted in the counting circuit and the total time for any counting operation is dependent upon the number of words responding and thus to be counted.

In this initial interrogation, each position of the counting circuit 18 counts in response to the current on the corresponding line 87. As each word is counted, a pulse passes through the line 44 to the OTR counter 22. When the last, in this case the sixteenth word, is counted, the output on line 180 from the sixteenth unit of the counting circuit 18 switches the count control flip-flop 198 to its binary 1 state. The output of flip-flop 198 is fed through the line 177 to the pulse generator and effects termination of the signals, first on the line 172, next on the line 174 and last on the line 176. The OTR counter 22 now contains the number sixteen, that is, the number of words in data memory 10.

It is noted that in this embodiment the OTR counter 22 has a capacity for counting thirty-one words. However, since only sixteen words are contained in the data memory, it is desirable to have the difference, that is 15 (31—16), entered into the AO register 30. To effect this, a signal is applied to OR gates through line 48 during time period 10 to complement the OTR counter 22. During time period 11, a signal is applied to the line 290 to transfer this complemented value, fifteen, into the AO register 30. During time period 12 a signal is applied to the line 47 to set the OTR counter to its full capacity count of thirty-one. The sixteen words in data memory actually will be assigned ordinals 16 through 31 with the highest value number being assigned the ordinal 16.

During time period 13 a complement signal is applied to line 50 which is effective to complement all OT registers 12 in accordance with the value in the OTR counter. Since the OTR counter contains the binary number thirty-one, all ones, the OT registers are set to all ones. During time period 14 a reset signal is applied to the line 54 which is gated through all AND circuits 56 by the signals on all sixteen lines 87 which have been fed back from data memory. Thus all sixteen OT registers 12 are reset to their binary 0 states. This reset pulse also transfers the one count from the BTR counter to all sixteen BT registers 14. Later, during time period 18, a complement pulse will again be applied to the line 50 which complements the OT registers and stores the number thirty-one in each of the sixteen OT registers 12. At the end of time period 14, the switch 168 is moved to its OFF position where it inhibits the shunt lines 158.

It is noted, with reference to the timing chart of FIG. 7, that point alpha 1 has now been reached. The time periods 1 through 14 will not be repeated again, although subsequent time periods may be repeated.

At this point, the AO register contains the value fifteen, the OTR counter contains the value thirty-one, the OT registers will contain the value thirty-one upon the next complement pulse during time period 18, on line 50, the BT registers contain a one count and the BTR counter contains a one count.

*Interrogate first bit position*

Having determined the number of words in data memory and having effectively stored the number in all of the OT registers, it is time to interrogate the first or high order bit position of all sixteen words of data memory for the presence of binary 1's. During time period 15, the sixteen flip-flops 100 in the BT register unit 14 are reset to binary 0 by a pulse on line 103. Also during time period 15 the count control flip-flop 198 is reset to binary 0. During time period 16 a tag interrogation pulse is applied to the line 63 to interrogate the OT registers. Since all OT registers at this point store binary 0's, the signal on line 63 branches and emerges on all sixteen lines 62. Again the output of the OR gate 264 is ignored and the signals on the sixteen lines 62 pass through their respectively associated read out units 66, reading out the value 1 to the output flip-flops 108 and setting all sixteen flip-flops 100 to their binary 1 states. During time period 17, a signal on the line 122 transfers the value 1 from the output flip-flops 108 into the BTR counter.

The 1 count in the output flip-flops 108 conditions the decoder 26 in accordance with the chart shown in column 13 such that current appears on the line 140 corresponding to the high order bit position of all words in data memory, and currents appear on the line 142 of all other orders. Thus, all orders of the words in data memory, except the high order, are masked in such a manner that either a binary 1 or a binary 0 stored in a compare unit 90 will cause a current to appear on the input line 87 to the next succeeding compare unit 90. Thus all units 90, except the one being interrogated, are effectively masked to respond as though they did store a binary 1. In this way, a single binary bit position may be interrogated.

During time period 18, a complement pulse is applied to line 50 and the tags 31 are actually written into all sixteen of the OT registers.

At this point the first selection may be made since the currents feeding into the high order bit registers of data memory through the sixteen AND gates 134 pass to the next succeeding compare unit 90 in their respective registers only if the corresponding high order register stores a binary 1. If an interrogated bit position register stores a binary 0, the current emerges on the corresponding line 86 and is diverted through the line 102 to ground.

Referring to FIG. 6, the eleven words in Group I having the values 207, 199, 197, 192, 170, 159, 153, 142, 136, 129 and 129 contain a binary 1 in their high order positions. During time period 19, a data memory interrogation pulse is applied to the line 124, advancing the BTR counter 24 to a count of 2. Currents emerge from the data memory 10 only on the lines 87 corresponding to these eleven words which contained a binary 1 in their high order bit positions. The remaining five words having the values 102, 85, 68, 58 and 31 are, for the moment, removed from further consideration.

The data memory interrogation pulse on line 124 was started during time period 19 and continues into time period 20. The multiple count detect unit 20 is actuated by the application of a signal to the line 200 to determine whether there was a single response, no response, or more than one response. In this case, eleven words responded. Therefore, when the gating signal is applied to the line 200, the input to AND gate 232 from the line 230 is gated to the pulse generator 32 to initiate a particular sequence of pulses or, in effect, to direct the system to a particular portion of the program illustrated in the timing chart FIG. 7.

Time period 20 is the end of one sequence of steps, steps 15–20, which may be repeated in later interrogations. At the end of time period 20 the multiple count detect unit 20 has indicated more than one response. Therefore, in accordance with the note adjacent to time period 20 in FIG. 7, the operation proceeds to time period 21. If the indication had been "no response," the operation would skip to time period 29. If the indication had been "only one response," the operation would skip to time period 31.

The data memory interrogation signal is still on line 124. During time period 21 the value 15 in the AO register 30 is read into the OTR counter 22 by a gating signal to the line 292 and replaces the value 31. The OTR counter 22 and the AO register now both contain the value 15. During time period 22, the counting of responses is started. It is noted that during time period 20 a test was made merely to determine whether there were multiple responses. The counting takes place during time periods 22 through 26 as described previously for time periods 5 through 9. This count of 11 is added to the value 15 which is already in the OTR counter 22. The OTR counter now stands at 26 (15+11).

During time period 27, a complement pulse is applied to the line 50 to complement all OT registers in accordance with the value 26. The response outputs of the Group I words of data memory are fed back through the corresponding lines 87 to corresponding Group I OT registers and, during time period 28, are gated through the corresponding AND gates 56 by a reset pulse on the line 54. Thus, the Group I OT registers are reset to 0 and the 2 count in the BTR counter is transferred to the Group I BT registers.

At this point, the steps shown in time periods 15 through 20 are repeated, that is, the flip-flops 100 and 198 are reset; a tag interrogation signal is applied to line 63 and passes through the 11 Group I sets of AND gates 64 to read the bit number 2 from the Group I BT registers to the output flip-flops 108, and to set corresponding flip-flops 100, a signal is applied to the line 122 to transfer the 2 count from the output flip-flops 108 to the BTR counter.

In response to the 2 count in the output flip-flops 108, the decoder 26 is operative to place a signal on the line 140 of the second highest bit position (bit position (2) of each word of data memory, and to place signals on lines 142 of all other bit positions including the high order bit position. Thus, all compare units 90, except those in the second highest order bit position, are masked to pass the input current to their respective output lines 87 regardless of their actual contents. During time period 18 a complement pulse applied to the line 50 actually enters the number 26 (15+11) in the Group I OT registers. During time period 19, a data memory interrogation pulse applied to the line 124 is effective to advance the BTR counter 24 to a count of 3.

During time period 20 a signal is applied to the line 200 to effect the multiple count detection. Of the eleven words responding in the high order bit position, only four, that is those having the values 207, 199, 197 and 192, now respond and thus outputs are derived only on the lines 87 corresponding to these four words. Again, the count of responses is more than one and the gating signal on line 200 opens gate 232 to initiate repetition of time periods 21 through 28.

During time period 21 a signal applied to line 292 transfers the value 15 from the AO register 30 into the OTR counter 22. During time periods 22 through 26 counting of the four responding words is effected and the 4-count is entered into the OTR counter 22 to advance the OTR counter to a count of 19.

During time period 27 a complement pulse on line 50 complements all OT registers and during time period 28 the reset signal on line 54 gates the signals on line 87 of the four last responding words through corresponding AND gates 56 to reset the corresponding four OT registers to zero. This reset pulse extending to the corresponding four BT registers on the lines 74 reads the bit number three from the BTR counter into the four BT registers.

At this point the operation returns to repeat the steps shown in time periods 15 through 20, that is, the flip-flops 100 and 198 are reset, a tag interrogation signal is applied to line 63 and passes through the four sets of AND gates 64 to read the bit number 3 from the corresponding BT registers to the output flip-flops 108 and to set corresponding flip-flops 100; a signal applied to the line 122 transfers the three count from the output flip-flops 108 to the BTR counter. The output of OR gate 264 is ignored.

In response to the three count in the output flip-flops 108, the decoder 26 masks all compare units 90, except those in the third highest order bit position.

During time period 18 a complement pulse applied to the line 50 actually enters the number 19 (15+4) in the four OT registers. During time period 19 a data memory interrogation pulse applied to the line 124 is effective to advance the BTR counter 24 to a count of 4.

During time period 20 a signal applied to the line 200 effects the multiple count detection. Of the four words responding to the high order bit position interrogation, that is, those having the values 207, 199, 197 and 192, all contain zeros in their third bit positions and thus none of them responds to the interrogation for binary 1.

Since none of the four words responded to the binary 1 interrogation, the signal on the line 208 in the multiple count detector 20 is gated by the signal on the line 200 into the pulse generator 32 via line 202. Referring to the timing chart adjacent time period 20, it is noted that when the multiple count detect equals zero, the operation skips to time period 29.

*Response count equal zero*

Since none of the four words responded to the binary one interrogation in bit position 3, there are no outputs on lines 87 to feed back to the corresponding OT registers 12. Therefore it is necessary to simulate responses. The four flip-flops 100 in the BT registers are still set to their binary one condition and thus condition the four AND gates 134 in the gate unit 16. Therefore, during time period 29, a signal is applied to the line 136 which gates the binary one state of the four flip-flops 100 through the AND gates 134 whereby signals are fed back to the four OT registers 12 via lines 60. Also, during time period 29 a complement pulse applied to line 50 complements all the OT registers in accordance with the value in the OTR counter which is still set at its last value of 19. During time period 30 a reset pulse is applied to the line 54 to gate the simulated response signals on the four lines 60 through the corresponding AND gates 56 to reset the four OT registers to zero and to enter the 4 count from the BTR counter 24 into the corresponding BT registers.

Referring to the timing chart the note in the column adjacent time period 30 indicates that the operation now returns to alpha 1, to repeat the steps shown in time periods 15 through 20. That is, the flip-flops 100 and 198 are reset, the tag interrogation signal applied to line 63 passes through the four sets of AND gates 64 to read the bit number 4 from the corresponding BT registers to the output flip-flops 108 and to set corresponding flip-flops 100; a signal applied to the line 122 transfers the four count from the flip-flops 108 into the BTR counter.

In response to the four count in the output flip-flops 108, the decoder 26 is operative to place a signal on the line 140 of the fourth highest bit position of each word of data memory and to mask all other bit positions. During time period 18 a complement pulse applied to the line 50 re-enters the number 19 (15+4) in the four OT registers. During time period 19, a data memory interrogation pulse applied to the line 124 is effective to advance the BTR counter to a count of 6. During time period 20 a signal applied to the line 200 effects the multiple count detection. Again the same four words contain all the zeros in the fourth bit positions and therefore the multiple count detection unit 20 gates a "no response" signal from the line 208 through AND gate 214 and the line 202 to the pulse generator 32.

Again the operation skips from time periods 20 to time period 29 and again the simulated response is effected by applying a signal to the line 136 to feed simulated response signals back to the four OT registers via lines 60. Also during the time period 29 a complement signal applied to the line 50 complements all OT registers corresponding to flip-flops 42 in the binary 1 state. During time period 30 the four OT registers are reset to zero and the bit number 5 in the BTR counter is transferred to the four BT registers. Again the operation returns to repeat steps 15 through 20. The flip-flops 100 and 198 are reset, a tag interrogation signal applied to line 63 passes through the four sets of AND gates 64, to read the bit number 5 into the output flip-flops 108 and to set the corresponding flip-flops 100; a signal applied to the line 122 transfers the 5 count from the output flip-flops 108 to the BTR counter.

In response to the 5 count in the output flip-flops 108, the decoder 26 is operative to place a signal on the line 140 of the fifth highest bit position of each word of data memory and to mask all other bit positions. During time period 18 a complement pulse is applied to the line 50 to re-enter the ordinal 19 in the four OT registers. During time period 19, a data memory interrogation pulse applied to line 24 is effective to enter advance the BTR counter 24 to a count of 6.

During time period 20, a signal applied to the line 200 effects the multiple count detection. Of the four words interrogated, only one, that is the one having the value 207, contains a binary one bit in the fifth highest bit position. Thus, since there is a single response, a signal on the line 216 is gated through the AND gate 218 and the line 204 to the pulse generator 32. Referring to the timing chart adjacent time period 20 it is noted that, when the multiple count detection unit indicates a count equal to one, the operations skips to time period 31.

*Response count equals one*

During time period 31 a signal is applied to the line 292 to transfer the value 15 from the AO register 30 into the OTR counter 22. The data memory interrogation signal on line 124 which was initiated during the last preceding time period 21 continues and, during time periods 32–36, the counting circuit 18 enters a 1 count into the OTR counter 22, thus advancing it to a count of 16 (15+1). During time period 37, a pulse is applied to the line 50 to complement all OT registers in accordance with the value 16 in the OTR counter. During time period 38 a reset pulse is applied to the line 54 and is effective to reset only the OT register corresponding to the single word which responded to the last interrogation and to enter the BTR counter value of 6 into the corresponding BT register. This is word number 1 having the value 207. During time period 39 a complement pulse is applied to the line 50, setting the word 1 OT register to the value 16.

At this point, four of the words in data memory have been assigned their proper ordinals. Word number 1 having the value 207 has been assigned the ordinal 16 which will be the lowest number assigned in view of the previously described capacity of the counter. Of the three words presently having the ordinal 19, one is properly designated 19, whereas the other two ordinals will be subsequently changed to the ordinals 17 and 18. The other seven words of Group I are assigned the ordinal 26. One of the words is properly designated 26 whereas the remaining six will be designated 20, 21, 22, 23, 24 and 25. Five words now have the ordinal 31. Only one of these five words is properly designated 31 and the other four will subsequently be designated 27, 28, 29 and 30.

Having obtained an "only one" response from the multiple count detection circuit 20, it is now necessary to select the group of words having the next higher ordinal. This is the three words having the ordinal 19. At this point the tag match indicator 28 comes into use.

Also during time period 39, a signal applied to the line 254 is effective to reset flip-flops 272 and 276 in the tag match indicator 28 to their binary 0 states. During time period 40 a signal is applied to the line 290 to transfer the value 16 from the OTR counter to the AO register. During time period 41 a signal is applied to the line 46 to add a supplemental count to the OTR counter 22, advancing it to a count of 17 (16+1). The OT registers 12 will next be interrogated for the ordinal 17. During the time period 42 a signal is applied to the line 50 to complement all OT registers 12 in accordance with the value 17 in the OTR counter. During time period 43 a signal is applied to the line 252 so as to make use of the output of the OR gate 264.

During time period 43 a tag interrogation signal is applied to the line 63 to interrogate all OT registers for the ordinal 17. It will be recalled that the only ordinals present in the OT register unit 12 are the ordinals 31, 26, 19 and 16, and therefore, the ordinal 17 will not be found and the interrogation pulse 63 will not pass through any of the sets of OT register AND gates 64 to the OR gate 264. Therefore, there will not be a match indicating output on the line 250.

The absence of the match indicating output on line 250 conditions the AND gate 270 to gate through a signal on the line 252, which is applied during time period 43, to switch the flip-flop 272 to its binary 1 state, thereby conditioning AND gate 274 and also AND gate 268. AND gate 268 will remain conditioned through subsequent interrogations. During time period 44 a gating signal is applied to the line 256 which now gate the binary 1 output of the flip-flop 272 through AND gate 274 and the line 258 to the pulse generator 32. Also during time period 44 a complement signal on line 50 restores all OT registers to their previous values.

Referring to the timing chart adjacent time period 44, it is noted that, for a non-match response on line 258, the operation advances to alpha 3 which starts at time period 45. This advance to time period 45 is controlled by the signal on line 258 to the pulse generator 32 where the particular sequence of pulses starting with time period 45 is initiated.

At this point it has been determined that the ordinal 17 is not stored in the OT register unit 12. An interrogation will now be made to determine whether the ordinal 18 is stored in the OT register. During time period 45 a signal is applied to the line 46 to add a supplemental count to the OTR counter 46, thus advancing the OTR counter to the value 18. During time period 46 a complement signal applied to the line 50 complements all OT registers in accordance with the value 18. During time period 47 a tag interrogation signal is applied to the line 63 to interrogate for the presence of the tag 18. This tag is not present and therefore there will be no signals into the OR gate 264 and thus the gating signal on line 252 is passed through the AND gate 270. However, this has no effect since the flip-flop 272 already stands in its binary 1 state. During time period 48 a gating pulse is applied to the line 256, gating the binary 1 output of flip-flop 272 through the AND gate 274 and the line 258 to the pulse generator 32. Also during time period 48 a complement pulse restores all OT registers to their previous values.

Referring to the timing chart adjacent time period 48, it is noted that, for a non-match response on the line 258, the operation returns to the point alpha 3 and repeats steps 45 through 48. Returning now to time period 45, the line 46 is again pulsed to advance the OTR counter to the value 19. During time period 46 a complement signal applied to the line 50 complements the OT registers in accordance with the value 19. Words 2, 3 and 4 have the tag 19 assigned thereto in their OT registers and therefore there will be a positive response from the OR gate 264 on the line 250 when an interrogation pulse is applied to line 63 during time period 47. This output on the line 250 is ineffective with respect to the AND gate 270 because of the inversion at 266, but is now effective to gate the binary 1 output of flip-flop 272 through AND gate 268 to set flip-flop 276 to its binary 1 state; thereby conditioning AND gate 278 and, through AND gate 273 unconditioning AND gate 274. During time period 48 a signal applied to the line 256 gates the binary 1 output of flip-flop 276 through AND gate 278 and line 262 to the pulse generator 32 where it initiates the desired sequence of pulses. Referring to the timing chart adjacent time period 48 it is noted that, for a match response on the line 262 after a non-match response, the operation advances to alpha 4 which starts with time period 49.

During time period 49 the flip-flops 100 in the BT registers are reset by a signal on the line 103. During time period 50 a complement pulse is applied to the line 50 to complement the OT registers in accordance with the value 19 in the OTR counter. During time period 51 a tag interrogation pulse is applied to the line 63 and flows through the AND gates 64 of the three OT registers which stored the ordinal 19, thus reading out the bit number 5 from the corresponding read out units 66 into the output flip-flops 108 and setting corresponding flip-flops 100 to binary 1. Also during time period 51 a signal is applied to the line 122 to transfer the contents of the output flip-flops 108 into the BTR counter. During time period 52 a supplemental count is entered into the BTR counter by pulsing a line 126, thus advancing it to 6.

During time period 53 a signal is applied to the line 136 to simulate an output response from the three flip-flops 100 which is fed back to the corresponding OT registers via lines 60. Also during time period 53 a reset signal is applied to the line 54 to gate the signals on the three lines 60 through the AND gates 56 to thereby reset the three OT registers to zero and also to read the bit count 6 from the BTR counter into the three BT registers.

After time period 53, the operation returns to the steps shown in time periods 15 through 20. The flip-flops 100 and 198 are reset to their binary 0 states; a tag interrogation signal is applied to the line 63 and passes through the three sets of AND gates 64, reading the 6 count from the three BT registers to the output flip-flops 108 and setting the corresponding flip-flops 100; and a signal is applied to the line 122 to transfer the 6 count from output flip-flops 108 to the BTR counter.

In response to the 6 count in the output flip-flops 108, the decoder 26 is operative to place a signal on the line 140 of the sixth highest bit position of each word of data memory and to mask all other bit positions. During time period 18 a complement pulse is applied to the line 50 to re-enter the value 19 in the three OT registers. During time period 19 a data memory interrogation pulse is applied to the line 124 and is effective to advance the BTR counter 24 to a count of 7. During time period 20 a signal is applied to the line 200 to effect the multiple count detection. Of the three words having the ordinal 19, only two of them contain a binary 1 in their sixth bit positions and therefore only two respond to this interrogation. The output from the multiple count detector is on the line 206.

Since the count is greater than 1, the operation proceeds to time period 21 during which a signal is applied to the line 292 to enter the contents of the AO register into the OTR counter. This transferred number is the value 16. During time periods 22 through 26, the two responding words are counted and the count is added to the OTR counter which then stands at the value 18. During time period 27 a complement pulse on line 50 complements the OT registers in accordance with the value 18. During time period 28, a reset signal is applied to line 54 to reset the two corresponding OT registers to binary 0. The reset pulse also transfers the seven count in the BTR counter to the corresponding two BT registers.

Steps 15 through 20 are repeated. The flip-flops 100 and 198 are reset, a tag interrogation signal is applied to line 63 and passes through the two sets of AND gates 64 to read the bit number 7 from the BT registers to the output flip-flops and to set the corresponding flip-flops 100 and a signal is applied to line 122 to transfer the 7 count from the output flip-flops 108 to the BTR counter.

In response to the 7 count in the output flip-flops 108, the decoder 26 is operative to place a signal on the line 140 of the seventh highest bit position of each word of data memory and to mask other bit positions. During time period 18 a complement pulse applied to the line 50 stores the number 18 in the corresponding two OT registers. During time period 19, a data memory interrogation pulse applied to the line 124 is effective to advance the BTR counter 24 to a count of 8.

During time period 20, a signal is applied to the line 200 to effect a multiple count detection. Of the two words interrogated, only one contains a binary 1 in the seventh bit position and thus an "only one" indication is fed through line 204 to the pulse generator 32.

Since the indication is "only one," the operation proceeds to time period 31 where a signal is applied to the line 292 to read the value 16 from the AO register 30 into the OTR counter. During time periods 32–36 the counting circuit 18 enters a 1-count into the OTR counter thus advancing it to the value 17. During time period 37 a pulse on line 50 complements all OT registers in accordance with the value 17 in the OTR counter. During time period 38 a reset pulse on line 54 resets the single responding OT register to 0 and enters the bit count of 8 into the corresponding BT register. It will be shown that the OT register corresponding to the word 2 having the value 199 now contains the proper ordinal 17 and the OT register corresponding to word 3 having the value 197 is properly assigned the ordinal 18.

During time period 39 the tag match indicator 28 is reset by a pulse on the line 254 and a complement pulse on line 50 writes the ordinal 17 into the OT register corresponding to word 2. During time period 40 a signal on the line 290 transfers the value 17 from the OTR counter to the AO register. During time period 41 a supplemental count is entered into the OTR counter through line 46 advancing it to the value 18. During time period 42 a complement pulse is applied to line 50 to complement all OT registers in accordance with the value 18 in the OTR counter. During time period 43 a tag interrogation pulse on line 63 passes through the AND gates 64 of the single OT register storing the ordinal 18 and produces an output from the OR gate 264 on the line 250. This output is gated by a pulse on line 256 during time period 39 and causes an output on the line 260 which indicates that the interrogated tag 18 was found. This in turn causes the steps of time periods 40 through 44 to be repeated.

During time periods 40–44, the value 18 is shifted from the OTR counter to the AO register; the OTR counter is advanced to the value 19; and the OT registers are interrogated for the ordinal 19. The ordinal 19 is found and the signal on line 260 returns the operation again to time period 40.

During time period 40–44, the value 19 is shifted from the OTR counter to the AO register; the the OTR counter is advanced to the valve 20; and the OT registers are interrogated for the ordinal 20. The ordinal 20 is not found and the signal on the line 258 advances the operation to time period 45.

During time period 45 the OTR counter is advanced to the value 21 which is not found in the OT registers during the following time periods 45–48. The resultant output on the line 258 during time period 48 returns the operation to time period 45. Time periods 45–48 will be repeated to interrogate successively for ordinals 22, 23, 24, 25 and 26. Ordinal 26 will be found and the operation will be advanced from time period 48 to time period 49. At this point the OTR counter stands at 26 and the AO register stands at 19.

During time period 49 the flip-flops 100 are reset. During time period 50 all OT registers are complemented in accordance with the value 26 in the OTR counter. During time period 51 a tag interrogation pulse on the line 63 emerges on the lines 62 from the 7 OT registers which store the tag 26, reading the contents of the corresponding BT registers into the output flip-flops 108, and setting the corresponding flip-flops 100. Since only the highest order bit positions of these last 7 words had been interrogated, the corresponding BT registers store the value 2. This value 2 is read from the output flip-flops 108 to the BTR counter by a pulse on the line 122. During time period 52 a signal on the line 126 enters a supplemental count in the BTR counter thus advancing this counter to the value 3. During time period 53 a simulated response of these 7 words is effected by signal on the line 136 and the feedback via lines 60 is gated through the corresponding AND gates 56 by a signal on the line 54 to reset the corresponding 7 OT registers to binary 0 and transfer the 3 count from the BTR counter into the 7 BT registers. The operation now returns to the steps shown in time periods 15 through 20.

Interrogation of the third bit positions advances the BTR counter to 4. In the third bit position a single response is detected during time periods 15 through 20. During the following time periods 31 through 44, the OT register corresponding to the single word having the valve 170 is set to 20, the AO register is set to 20, the OTR counter is set to 21 and the OT registers are interrogated for the ordinal 21.

In the manner previously described, successive interrogations will be made for ordinals 21, 22, 23, 24, 25 and 26. When the ordinal 26 is found, the group of six words having this ordinal will be interrogated in the fourth bit positions and a double response for words having values 159 and 153 will be detected. The ordinal 22 is placed in both of the corresponding OT registers. These two words are interrogated in the fifth bit positions and are found to be the same, but interrogation in the sixth bit positions assigns the ordinal 21 to the word having the value 159 since a single response is received. This leaves an already assigned ordinal 22 in the OT register corresponding to the word having the value 153.

The AO registers now stands at 21, the OTR counter is set successively to the values 22, 23, 24, 25 and 26 to interrogate for those ordinals. When the four words having the ordinal 26 respond, interrogation will now be made of those words in their fifth bit positions because of the automatic advancing of the BTR counter during time period 52. In the fifth bit positions the words having the values 142 and 136 respond and are assigned the ordinal 24. In the next interrogation the single word having the value 142 responds and is assigned the ordinal 23.

Interrogation for the ordinal 24 shows it is assigned and interrogation is made for the ordinals 25 and 26. The remaining two words having the ordinal 26 have the same value 129. These two words are interrogated first in the sixth bit positions and then in the seventh, both of which show all 0's. Since two words have the value 129, the circuit including the lines 150 and 152 comes into use. Both words having the value 129 respond but the response is directed to the "only one" line 216. The operation proceeds to time period 31 and the 2-count is added to the value 24. The ordinal 26 is stored in the OT registers corresponding to both words. The ordinal 25 will not appear in any OT register but its absence will indicate that two words are identical. All remaining words will be assigned the proper ordinals.

Interrogation is made successively for the ordinals 27, 28, 29, 30 and 31 in the OT registers. The interrogation for the ordinals 27, 28, 29 and 30 is unsuccessful, but the interrogation for the ordinal 31 results in response of the OT registers for the remaining 5 words.

The first interrogation of these five words is in the second bit positions since it has already been determined, in the initial interrogation, that the first bit positons of these 5 words contain binary 0's. During interrogation of the second bit positions, the three words having the values 102, 85 and 68 respond and these three words are assigned the ordinal 29 (26+3). It is apparent that the original 29 is properly assigned to one of these three words and the other two will have the ordinals 27 and 28. Interrogation of the third bit position results in a response only from the word having the value 102. The ordinal 27 (26+1) therefore is stored in the OT register corresponding to this word. The remaining two words having the ordinal 29 are interrogated in their fourth bit positions and only the word having the value 85 responds and is thus assigned the ordinal 28 (27+1). The original 29 is already stored in the OT register corresponding to the word having the value 68.

The OT registers are then interrogated for the next higher ordinal 30 which is not found, but interrogation for the ordinal 31 results in the response of the remaining two words. It has been determined that the second bit positions contained binary 0's so the interrogation starts with the third bit position and this results in a response from only the word having the value 58. Therefore, the ordinal 30 (29+1) is stored in the OT register corresponding to this word. The ordinal 31 already is stored in the OT register corresponding to the last word.

After the ordinal 30 is assigned to an OT register the OTR counter will be advanced to 31 and an interrogation will be made for the value 31 in the OT registers. The ordinal 31 will be found and the next supplemental input, to the OTR counter on line 46 causes it to overflow and all orders of the OTR counter will register binary 0's. The operation of the system is halted at this point by gating the overflow from the high order flip-flop 42–5 via line 310 and the supplemental pulse on line 46 via line 312 through an AND gate 314. A flip-flop 316 which was reset to zero by a pulse on the binary 0 input line 318 during time period 2 is switched to its binary 1 state by the output of AND gate 314 applied to the complement input of flip-flop 316. The binary 1 output of flip-flop 316 operates a stop device 320 which may be, for example, the power line switch to the system.

This system may be operated in a manner whereby the lowest sequential ordinal is assigned to the lowest valued number. This may be accomplished very simply by setting the flip-flops 91 to binary 0 instead of binary 1. In that event, the interrogation is made for 0's and the lowest sequential ordinal is assigned to the lowest valued number.

Another way of assigning the lowest sequential ordinal to the lowest valued number is to use a count down counter as the ordinal tag register counter.

A simplification of the system may be effected which consists of eliminating the bit tag registers. The flip-flops 100 are then connected directly to the lines 62 from the OT registers. The system without the BT registers is less efficient since all orders of each group of words must be interrogated and this entails duplicate interrogation of some orders of each group of words after the first group.

In this simplified mode of operation the BTR counter is reset to zero by a pulse on line 107 when each single word response is received which signals the end of one group interrogation. The BTR counter is then set to 1 by a pulse on the line 122. Thereafter, the operation is the same as that which includes the BT registers.

While the embodiment of this invention has been described as a system for ordering binary numbers in accordance with their relative values, it will be understood that data other than numeric values may be ordered in accordance with any criteria where each criterion is given a weighted value relative all other criteria. It is apparent that numeric values recorded in code representations other than binary may be ordered by this system.

It will be understood that two or more bit positions may be treated as a single order by coincidently energizing their lines 140, in which event all such bit positions must contain data corresponding to the setting of the associated flip-flops 91 in order to obtain a match indication.

While the invention has been particularly shown and described with reference to a preferred embodiment thereof, it will be understood by those skilled in the art that various changes in form and details may be made therein without departing from the spirit and scope of the invention.

What is claimed is:

1. An associative memory system for assigning sequential ordinals to words in memory in accordance with their relative values comprising, in combination, a memory storing a plurality of multi-order words, each order consisting of at least one data bit, each order having a unique weighted value, means for conditioning said memory selectively for interrogation for particular data bits, means for conditioning said memory for parallel-by-word, serial-by-bit interrogation starting with the heaviest weighted data bit, means for deriving response signals from words having said bits in interrogated bit positions, means for initially obtaining a response from each word of said memory, an ordinal tag register corresponding to each said word for storing a function of the number of responding words, means utilizing said responses to store said function of responding words in said registers corresponding to responding said words after interrogation of each bit position, each said function defining the word group for interrogation in the next bit position, and means operable each time a single word responds to interrogation of a bit position for storing a next higher sequential ordinal in said register corresponding to said single word.

2. The invention of claim 1 including means for storing a next higher sequential ordinal plus X in said registers corresponding to all words responding to interrogation of the lowest order bit position where X equals the number of responding words.

3. A cyclicly operable associative memory system for assigning sequential ordinals to multi-order numerical words in memory in accordance with their relative values comprising, in combination, a memory storing a plurality of multi-order binary words, each order consisting of at least one information bit, first means for conditioning said memory for interrogation for particular binary bits, second means for conditioning said memory for parallel-by-word, serial-by-order interrogation of said memory, means for cyclicly interrogating said memory in accordance with said conditioning, means for deriving output responses from interrogated words having said particular bits in interrogated orders, means for initially deriving output responses from all words in said memory, means for counting said responses, other means for incrementally advancing said response counting means after each interrogation cycle, means for uniquely manifesting when said responses number 0, more than 1 and only 1, an ordinal register corresponding to each said word, means for simulating responses of a last interrogated group of words, means for transferring the contents of said response counting means to all said ordinal registers corresponding to responding said words, means for interrogating all said ordinal registers in accordance with a value in said response counting means, means for counting orders interrogated, other means for incrementally advancing said order counting means during each cyclic interrogation of said memory, an order register corresponding to each said word, order count transfer means operable after each said cyclic interrogation of said memory for transferring the contents of said order counting means to all said order registers corresponding to words responding during last said interrogation cycle, order register transfer means operable during each interrogation of said ordinal registers for transferring the contents of said order registers corresponding to responding said words of second said conditioning means, means for transferring the contents of said second conditioning means to said order counting means, an assigned ordinal register for storing a last assigned sequential ordinal, means for transferring the contents of said assigned ordinal register to said response counting means, means for transferring the contents of said response counting means to said assigned ordinal register, means operable by said response manifesting means when said response is more than 1 to initiate a cycle of operation during which said order register transfer means are actuated, and the group of words responding during the first preceding said interrogation cycle is interrogated in the next lower valued order, means operable by said response manifesting means when said response is 0 to initiate a cycle of operation during which said response simulating means are actuated, said order register transfer means are actuated and last said group of words is interrogated in the next lower valued order, means operable by said response manifesting means when said response is 1 to initiate a cycle of operation during which said means for transferring the contents of said assigned ordinal register to said response counting means are actuated, said means for counting said responses are actuated to add said response to the value transferred from said assigned ordinal register, said means for transferring the contents of said response counting means to said ordinal register corresponding to said word which alone responded are actuated, said means for transferring the contents of said response counting means to said assigned ordinal register are actuated, said other means for incrementally advancing said response counting means are thereafter successively actuated, said means for interrogating said ordinal registers are successively actuated, until a next higher ordinal is found, said second conditioning means are actuated in accordance with order numbers in said order registers corresponding to words having said next higher ordinal in corresponding said ordinal registers, and said means for interrogating last said words are actuated.

4. The invention of claim 3 including means operable during interrogation of the lowest said order of said words to cause said manifesting means to manifest an only 1 response.

5. The invention of claim 3 wherein said means for incrementally advancing said response counting means and said means for interrogating said ordinal registers for said next higher ordinal include means operable, when a next higher sequential ordinal is present in said ordinal registers, for advancing said response counting means and interrogating for a next higher sequential ordinal, means operable, when said next higher sequential ordinal is not present in said ordinal registers, for storing the first preceding ordinal in said assigned ordinal register, for successively advancing said response counting means, for successively searching for higher ordinals in said ordinal tag registers until a higher ordinal is found after a sequential ordinal is not found, and for actuating said means for interrogating said memory for words having last said higher ordinal in corresponding said ordinal registers.

6. A cyclicly operable associative memory system for assigning sequential ordinals to multi-order words in memory in accordance with weighted values of said orders comprising, in combination, a memory storing a plurality of multi-order data words, each order consisting at at least one data bit, first means for conditioning said memory for interrogation for particular data bits, second means for conditioning said memory for parallel-by-word, serial-by-order interrogation of said memory, means for cyclicly interrogating said memory in accordance with said conditioning, means for deriving output responses from interrogated words having said particular data bits in interrogated orders, means for initially deriving output responses from all words in said memory, means for counting said responses, other means for incrementally advancing said response counting means after each interrogation cycle, means for uniquely manifesting when said responses number 0, more than 1 and only 1, an ordinal register corresponding to each said word, means for simulating responses of a last interrogated group of words, means for transferring the contents of said response counting means to all said ordinal registers corresponding to responding said words, means for interrogating said ordinal registers in accordance with a value in said response counting means, means for counting orders interrogated, other means for incrementally advancing said order counting means during each cyclic interrogation of said memory, an order register corresponding to each said word, order count transfer means operable after each said cyclic interrogation of said memory for transferring the contents of said order counting means to said order registers corresponding to words responding during last said interrogation cycle, order register transfer means operable during each interrogation of said ordinal registers for transferring the contents of said order registers corresponding to responding said words to second said conditioning means, means for transferring the contents of said second conditioning means to said order counting means, an assigned ordinal register for storing a last assigned sequential ordinal, means for transferring the contents of said assigned ordinal register to said response counting means, means for transferring the contents of said response counting means to said assigned ordinal register, means operable by said response manifesting means when said response is more than 1 to initiate a cycle of operations during which said order register transfer means are actuated, and the group of words responding during the first preceding said interrogation cycle is interrogated in the next lower valued order, means operable by said response manifesting means when said response is 0 to initiate a cycle of operation during which said response simulating means are actuated, said order register transfer means are actuated and last said group of words is interrogated in the next lower valued order, means operable by said response manifesting means when said response is 1 to initiate a cycle of operation during which said means for transferring the contents of said assigned ordinal register to said response counting means are actuated, said means for counting said responses are actuated to add said response to the value transferred from said assigned ordinal register, said means for transferring the contents of said response counting means to said ordinal register corresponding to said word which alone responded are actuated, said means for transferring the contents of said response counting means to said assigned ordinal register are actuated, said other means for incrementally advancing said response counting means are thereafter successively actuated, said means for interrogating said ordinal registers are successively actuated, until a next higher ordinal is found, said second conditioning means are actuated in accordance with order numbers in said order registers corresponding to words having said next higher ordinal in corresponding said ordinal registers, and said means for interrogating last said words are actuated.

7. The invention of claim 6 including means operable during interrogation of the lowest said order of said words to cause said manifesting means to manifest an only 1 response.

8. The invention of claim 6 wherein said means for incrementally advancing said response counting means and said means for interrogating said ordinal registers for said next higher ordinal include means operable, when a next higher sequential ordinal is present in said ordinal registers, for advancing said response counting means and interrogating for a next higher sequential ordinal, means operable, when said next higher sequential ordinal is not present in said ordinal registers, for storing the first preceding ordinal in said assigned ordinal register, for successively advancing said response counting means, for successively searching for higher ordinals in said ordinal tag registers until a higher ordinal is found after a sequential ordinal is not found, and for actuating said means for interrogating said memory for words having last said higher ordinal in corresponding said ordinal registers.

9. An associative memory system for assigning sequential ordinals to data words in memory in accordance with their relative values comprising, in combination, a memory storing a plurality of multi-order words, each said order consisting of at least one information bit, an ordinal tag register corresponding to each said word, means for conditioning said memory for parallel-by-word, serial-by-order interrogation of said words for particular data, means for interrogating said memory in accordance with said conditioning including a feed back response from each word having said data in the last previously interrogated order for interrogating a next order of responding said words, means for counting the number of said words having said data in an interrogated order, means for entering said count into said ordinal tag registers corresponding to said responding words, means for selectively manifesting when last said words number 0, more than 1, and only 1, means operable by said manifesting means when said manifested number is 1 or more than 1 for interrogating the next lower order of all last responding said words, means operable by said manifesting means when the manifested number is 1 for storing a lowest unassigned sequential ordinal in the ordinal tag register corresponding to the single word having said data, and means operable by said manifesting means, after a detection of a said single word for selecting a next group of said words in accordance with the ordinals in said ordinal tag registers for interrogation.

10. The system of claim 9 wherein said means operable for storing said lowest unassigned sequential ordinal includes means for storing the highest assigned sequential ordinal P and means for subsequently storing the ordinal $P+1$ in said ordinal tag register corresponding to said word which alone responds to the interrogation of a bit position.

11. The system of claim 10 wherein said means operable for selecting a next group of words for interrogation includes means for interrogating said ordinal registers for sequential ordinals larger than the ordinal last assigned to a said word which alone responded, means for transferring the highest said sequential ordinal P to said storage means therefor, means for interrogating said ordinal registers for the next larger ordinal after said highest sequential assigned ordinal, all said words having last said next larger ordinal in corresponding ordinal registers comprising said next group of words for interrogation.

12. An associative memory system for assigning sequential ordinals to data words in memory in accordance with their relative values comprising, in combination, a memory storing a plurality of multi-order words, each said order consisting of at least one information bit, an ordinal tag register corresponding to each said word, means for conditioning said memory for parallel-by-word, serial-by-order interrogation of said words for particular data, means for interrogating said memory in accordance with said conditioning including a feed back response from each word having said data in the last previously interrogated order for interrogating a next order of responding said words.

References Cited by the Examiner

UNITED STATES PATENTS

| | | | |
|---|---|---|---|
| 2,847,657 | 8/1958 | Hartley et al. | 340—172.5 |
| 2,854,652 | 9/1958 | Smith | 340—172.5 |
| 2,924,666 | 2/1960 | Brooks et al. | 340—172.5 |
| 3,031,650 | 4/1962 | Koerner | 340—172.5 |

ROBERT C. BAILEY, *Primary Examiner.*

IRVING L. SRAGOW, MALCOLM A. MORRISON, *Examiners.*